US006369375B1

(12) United States Patent
Ishiwata

(10) Patent No.: US 6,369,375 B1
(45) Date of Patent: Apr. 9, 2002

(54) DETECTION APPARATUS HAVING AN OBJECT GRADIENT DETECTION

(75) Inventor: Hiroshi Ishiwata, Hachioji (JP)

(73) Assignee: Olympus Optical Co. Ltd., Tokyo (JP)

( * ) Notice: Subject to any disclaimer, the term of this patent is extended or adjusted under 35 U.S.C. 154(b) by 0 days.

(21) Appl. No.: 09/400,433

(22) Filed: Sep. 21, 1999

(30) Foreign Application Priority Data

Sep. 22, 1998 (JP) .......................................... 10-286103

(51) Int. Cl.[7] .............................................. H01L 27/00
(52) U.S. Cl. ..................................... 250/208.1; 250/225
(58) Field of Search .......................... 250/208.1, 201.3, 250/201.5, 306, 307, 234, 235, 225; 359/386, 368, 370, 371; 356/364, 368

(56) References Cited

U.S. PATENT DOCUMENTS

| 5,420,717 A | 5/1995 | Tabata .......................... 359/371 |
| 5,969,855 A | 10/1999 | Ishiwata et al. ............. 359/386 |
| 6,134,009 A | * 10/2000 | Zavislan ....................... 356/364 |

FOREIGN PATENT DOCUMENTS

| JP | 5-149719 | 6/1993 |
| JP | 5-256795 | 10/1993 |
| JP | 7-239212 | 9/1995 |
| JP | 7-248261 | 9/1995 |
| JP | 9-15504 | 1/1997 |

* cited by examiner

Primary Examiner—Que T. Le
(74) Attorney, Agent, or Firm—Pillsbury Winthrop LLP

(57) ABSTRACT

A detection apparatus includes a differential interference microscope having a light source, an illumination optical system for splitting light from the light source into two polarized components, which are introduced onto an observation object and an imaging optical system for forming an image of the observation object; a device for changing the amount of retardation between the two polarized components; a device for photographing the image of the observation object; and a device for performing a calculation on the image captured by this photographing device. In the detection apparatus, amounts of retardation between the two polarized components are detected to form two differential interference images relative to the observation object in which the amounts of retardation between the polarized components are equal, but signs are different. Image information is extracted from these two differential interference images and thereby the profile of the observation object can be detected.

21 Claims, 12 Drawing Sheets

DETECTION APPARATUS HAVING AN OBJECT GRADIENT DETECTION

BACKGROUND OF THE INVENTION

1. Field of the Invention

This invention relates to an apparatus for detecting the profile, coordinates of observation points, and physical amounts of a step height and a phase change of an observation object from the image information of the observation object, obtained by a differential interference microscope, and to a detection method applied to this apparatus.

2. Description of Related Art

A differential interference microscope has been widely used to observe the microscopic structure of a human body or an IC pattern because information on a phase change and a step height of an observation object can be visualized by polarization interference. Recently, various attempts have been made in particular to use differential interference microscopes for the inspection of minute projections (bumps) for intimate contact prevention of a magnetic head provided on the surface of a magnetic disk, the measurements of a defect in a phase-shift reticle used for pattern exposure of a semi-conductor and the amount of retardation (a phase difference), and the positioning device of a semi-conductor wafer.

For example, each of Japanese Patent Preliminary Publications Nos. Hei 5-149719 and Hei 7-248261 discloses a technique of applying a differential interference microscope, which can be thought of as a shearing interferometer or a Mach-Zehnder interferometer, to the detection of a defect in a phase-shift reticle and a phase measurement. Japanese Patent Preliminary Publication No. Hei 7-239212 discloses a technique that the differential interference microscope is used to detect the edge of a positioning mark provided on a semi-conductor wafer, thereby positioning the wafer.

In these techniques, however, conventional interference measurement technology is merely applied to the differential interference microscope, and the influence of diffraction of light on the surface of an observation object is not taken into account. Moreover, the influence of a change intensity of light caused by a change in reflectance or transmittance of light on the observation object is not taken into account in like manner.

For these influences of the diffraction and intensity change of light on the observation object, in Japanese Patent Preliminary Publication No. Hei 9-15504, the present inventor clarifies the imaging characteristics of the differential interference microscope and provides an approach that extracts the phase information of the observation object from an image obtained by the differential interference microscope.

The differential interference microscope is such that a phase change in the surface of the observation object is converted into an image intensity distribution. Conversely, it is conceivable that, by analyzing the intensity distribution of a differential interference image, the phase change of the surface of the observation object can be detected. Further, it is set forth in Hei 7-239212 that since the edge of the step of the observation object brings about an abrupt phase change and as a result, the image intensity distribution is also abruptly changed, a portion where the image intensity distribution is abruptly changed is extracted from the differential interference image, and thereby the position of the step height of the observation object can be detected.

Japanese Patent Preliminary Publication No. Hei 5-256795 discloses a technique that uses the differential interference image of a normal sample as a reference image and compares this reference image with the image of the observation object, thereby detecting foreign matter contained in the observation object.

In the case where the phase distribution of the observation object is derived from the intensity distribution of the differential interference image, the phase change of the observation object cannot be accurately detected if factors other than the phase change of the observation object, such as changes in transmittance and reflectance of light relative to the observation object and a change in intensity of illumination light, are contained in the observation object.

This problem can be solved to some extent when the information of an object to be observed is previously acquired as the reference image to make the image processing of the observation object on the basis of data of the reference image. This method, however, requires a long time for comparison processing with the reference image, and is unfavorable in view of the fact that a reduction in time is required for the inspection of a semiconductor, for instance.

Where the edge of the step of the observation object is detected, the intensity distribution of the differential interference image in a portion which changes from a convexity to a concavity is reversed, compared with that in a portion which changes from a concavity to a convexity. Thus, in order to detect the edge, it is necessary to detect both the maxima and the minima of the intensity distribution of the differential interference image.

In this case, however, because of changes of detection characteristics of an element forming the differential interference image and intensity characteristics of illumination light, the brightness and contrast of the differential interference image are considerably changed. Moreover, there is the problem that when a gradient in a specific area on the observation object is detected, a specific value is to be detected from the differential interference image and in particular, the image becomes liable to undergo the influence of incoming disturbed light.

Where a change in the amount of phase of the step height of the observation object is measured, if the step height is relatively small, a fringe scan used for interference measurement is combined with the operation of the differential interference microscope and thereby the phase information of the observation object can be obtained. When the fringe scan is performed, four images in which the amounts of retardation between polarized components are different must be photographed for calculation, and hence a compromise to reduce the processing time cannot be effected.

When the amounts of retardation between polarized components are 0 and $\pi$, images vary widely in intensity. Thus, in order to detect a correct amount of phase, an imager whose dynamic range is wide becomes necessary, which makes an apparatus complicated.

In Hei 9-15504, the present inventor devotes attention to the imaging characteristics of the differential interference microscope and provides a technique of separating phase information and intensity information from the differential interference image.

SUMMARY OF THE INVENTION

It is, therefore, an object of the present invention to provide a detection apparatus for detecting specific physical amounts of, for example, the gradient, minute planar surface, edge, step height, and phase change of an observation object, in less time than in any other conventional technique, by separating phase information and intensity information from the differential interference image of the observation object derived from a differential interference microscope, and a detection method applied to this detection apparatus.

In order to achieve this object, the detection apparatus according to the present invention includes a differential interference microscope having a light source, an illumination optical system for introducing light from the light source onto an observation object, provided with a member for splitting the light from the light source into two polarized components, and an imaging optical system for forming an image of the observation object, provided with a member for recombining the two polarized components split in the illumination optical system; a means for changing the amount of retardation between the two polarized components; a means for photographing the image of the observation object; and a means for performing a calculation on the image captured by this photographing means.

In the detection apparatus of the present invention, amounts of retardation between the two polarized components split in the illumination optical system are detected to form two differential interference images relative to the observation object in which the amounts of retardation between the polarized components are equal, but signs are different. Subsequently, in these two differential interference images, a differential calculation is performed on each set of opposite pixels to obtain a differential image, and image information in a predetermined range is extracted from the differential image. By this method, the gradient of the observation object can be detected.

Further, in the detection apparatus of the present invention, amounts of retardation between the two polarized components split in the illumination optical system are detected to form two differential interference images relative to the observation object in which the amounts of retardation between the polarized components are equal, but signs are different. Subsequently, in these two differential interference images, a differential calculation is performed on each set of opposite pixels to obtain a differential image, and the absolute value of image information on the differential image is found to set a predetermined threshold so that an image area exceeding the threshold is obtained. By this method, the edge of the observation object can be detected.

Still further, in the detection apparatus of the present invention, amounts of retardation between the two polarized components split in the illumination optical system are detected to form two differential interference images relative to the observation object in which the amounts of retardation between the polarized components are equal, but signs are different. Subsequently, in these two differential interference images, a differential calculation and a summed calculation are performed on each set of opposite pixels so that differential image information and summed image information are obtained. When $\theta$ denotes the detected amount of retardation between the polarized components, D (x, y) denotes the differential image information, S (x, y) denotes the summed image information, and $\Phi$ (x, y) denotes the amount of phase on the observation object corresponding to each image information, the amount of phase $\Phi$ (x, y) on the surface of the observation object can be detected by detecting a differential value $\partial \Phi (x, y)/\partial r$ of the amount of phase on the observation object corresponding to a direction of separation r between the two polarized components to perform integral processing in the direction r, using one of the following equations:

$$\partial \Phi(x, y)/\partial r = k \cdot \{(1-\cos \theta) \cdot D(x, y)\}/\{2 \sin \theta \cdot S(x, y)\}$$

$$\partial \Phi(x, y)/\partial r = k \cdot \tan^{-1} [\{(1-\cos \theta) \cdot D(x, y)\}/\{2 \sin \theta \cdot S(x, y)\}]$$

Here, for a parameter k, in the case of a transmission observation on the observation object, $k=\lambda/2\pi$, and in the case of a reflection observation on the observation object, $k=\lambda/4\pi$, where $\lambda$ is the wavelength of light emitted from the light source of the detection apparatus.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
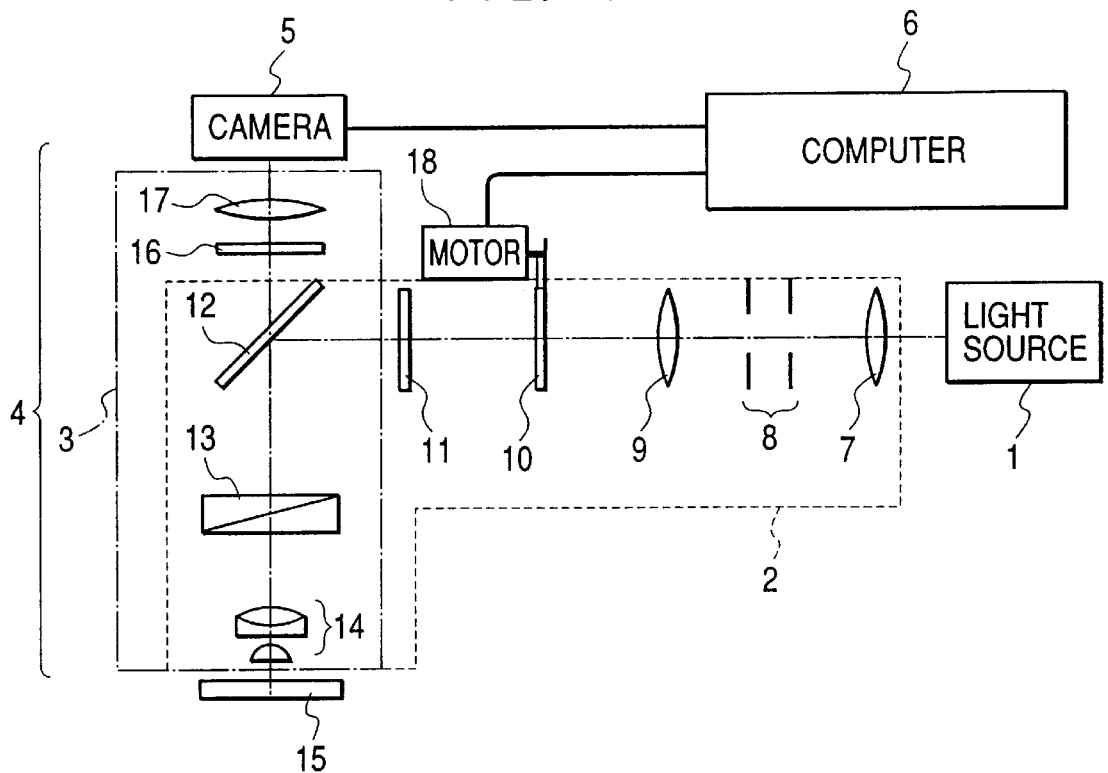
FIG. 1 is a view showing the arrangement of an apparatus for detecting various physical amounts relative to an observation object in a first embodiment of the present invention.

The detection apparatus according to the present invention is constructed with a differential interference microscope having a light source, an illumination optical system for introducing light from the light source onto an observation object, provided with a member for splitting the light from the light source into two polarized components, and an imaging optical system for forming an image of the observation object, provided with a member for recombining the two polarized components split in the illumination optical system; a means for changing the amount of retardation between the two polarized components; a means for photographing the image of the observation object; and a means for performing a calculation on the image captured by this photographing means.

In the detection apparatus of the present invention, as a first method, amounts of retardation between the two polarized components split in the illumination optical system are detected to form two differential interference images relative to the observation object in which the amounts of retardation between the polarized components are equal, but signs are different. Subsequently, in these two differential interference images, a differential calculation is performed on each set of opposite pixels to obtain a differential image, and image information in a predetermined step range is derived from the differential image. In this way, the gradient of the observation object can be detected.

In the detection apparatus of the present invention, as a second method, amounts of retardation between the two polarized components split in the illumination optical system are detected to form two differential interference images relative to the observation object in which the amounts of retardation between the polarized components are equal, but signs are different. Subsequently, in these two differential interference images, a differential calculation and a summed calculation are performed on each set of opposite pixels so that a differential image and a summed image are obtained. The ratio of image information between the differential image and the summed image is calculated, and from the result thus obtained, the image information in a predetermined step range is extracted. In this way also, the gradient of the observation object can be detected. Here, the differential image and the summed image are defined as follows:

Differential image=I (X, Y, θ)−I (X, Y, −θ)

Summed image=I (X, Y, θ)+I (X, Y, −θ)

where I (X, Y, θ)=the intensity distribution of a DIC image, and X and Y are the coordinates in an imager.

As a third method, when image information in a predetermined range, with a zero value as a center, is extracted from the image information obtained as the result of the calculation according to the first or second method, a portion or a planar portion of the observation object which does not undergo a phase change can be detected.

As a fourth method, the area or contour of the portion or the planar portion of the observation object which does not undergo a phase change, detected by the third method, is compared with the area or contour of a planar portion previously obtained from a sample as a reference. By doing so, the difference between the observation object and the sample can be detected.

As a fifth method, an edge on the observation object can be detected by the use of the detection apparatus of the present invention. Specifically, in the detection apparatus of the present invention, amounts of retardation between the two polarized components split in the illumination optical system are detected to form two differential interference images relative to the observation object in which the amounts of retardation between the polarized components are equal, but signs are different. Subsequently, in these two differential interference images, a differential calculation is performed on each set of opposite pixels to obtain a differential image, and the absolute value of image information on the differential image is found to set a predetermined threshold so that an image area exceeding the threshold is obtained. In this way, the edge of the observation object can be detected.

In the detection apparatus of the present invention, as a sixth method, amounts of retardation between the two polarized components split in the illumination optical system are detected to form two differential interference images relative to the observation object in which the amounts of retardation between the polarized components are equal, but signs are different. Subsequently, in these two differential interference images, a differential calculation and a summed calculation are performed on each set of opposite pixels to obtain a differential image and a summed image. The ratio of image information between the differential image and the summed image is calculated every pixel, and the absolute value of image information of the observation object is found from this result to set a predetermined threshold so that image information exceeding the threshold is extracted. In this way, the edge of the observation object can also be detected.

In the detection apparatus of the present invention, as a seventh method, amounts of retardation between the two polarized components split in the illumination optical system are detected to form two differential interference images relative to the observation object in which the amounts of retardation between the polarized components are equal, but signs are different. Subsequently, in these two differential interference images, a differential calculation is performed on each set of opposite pixels to obtain a differential image. The square of a value divided by a value between the maximum and the minimum of the step in the differential image is found to set a predetermined threshold so that an image area exceeding this threshold is derived. By doing so, the detection of the edge of the observation object becomes possible.

In the detection apparatus of the present invention, as an eighth method, amounts of retardation between the two polarized components split in the illumination optical system are detected to form two differential interference images relative to the observation object in which the amounts of retardation between the polarized components are equal, but signs are different. Subsequently, in these two differential interference images, a differential calculation and a summed calculation are performed on each set of opposite pixels to obtain a differential image and a summed image. The ratio of image information between the differential image and the summed image is calculated every pixel, and resulting image information is divided by a value between the maximum and the minimum in the image information. In addition, a resulting value is squared to set a predetermined threshold so that an image area exceeding the threshold is derived. In this way, the edge of the observation object can be detected.

As a ninth method, the position of the edge on the observation object can be detected by finding the coordinates of the image area exceeding the threshold in accordance with the fifth to eighth methods.

As a tenth method, when the coordinates are particularly set so that the image area exceeding the threshold is taken as a reference, the position of the edge of the observation object can be detected with a higher degree of accuracy.

As an eleventh method, a distance between edges on the observation object can be detected by finding the coordinates of the image area exceeding the threshold in accordance with the fifth to eighth methods.

As a twelfth method, when the coordinates are particularly set so that the image area exceeding the threshold is taken as a reference, the distance between the edges on the observation object can be detected with a higher degree of accuracy.

In the detection apparatus of the present invention, as a thirteenth method, amounts of retardation between the two polarized components split in the illumination optical system are detected to form two differential interference images in which the amounts of retardation between the polarized components are equal, but signs are different. Subsequently, in these two differential interference images, a differential calculation and a summed calculation are performed on each set of opposite pixels so that differential image information and summed image information are acquired. When $\theta$ denotes the detected amount of retardation between the polarized components, $D(x, y)$ denotes the differential image information, $S(x, y)$ denotes the summed image information, and $\Phi(x, y)$ denotes the amount of phase on the surface of the observation object corresponding to each image information, the amount of phase $\Phi(x, y)$ on the surface of the observation object can be detected by detecting a differential value $\partial \Phi(x, y)/\partial r$ of the amount of phase on the observation object corresponding to a direction of separation r between the two polarized components to perform integral processing in the direction r, using one of the following equations:

$$\partial\Phi(x, y)/\partial r = k \cdot \{(1-\cos\theta)\cdot D(x, y)\}/\{2 \sin\theta \cdot S(x, y)\} \quad (1)$$

$$\partial\Phi(x, y)/\partial r = k \cdot \tan^{-1}[\{(1-\cos\theta)\cdot D(x, y)\}/\{2 \sin\theta \cdot S(x, y)\}] \quad (2)$$

Here, for a parameter k, in the case of a transmission observation on the observation object, $k=\lambda/2\pi$, and in the case of a reflection observation on the observation object, $k=\lambda/4\pi$, where $\lambda$ is the wavelength of light emitted from the light source of the detection apparatus.

In the detection apparatus of the present invention, as a fourteenth method, the same procedure as in the thirteenth method is followed to acquire differential image information and summed image information. When $d(x, y)$ denotes image information in which the differential image information $D(x, y)$ is deconvoluted by using the optical transfer function (OTF) of the differential interference microscope, the amount of phase $\Phi(x, y)$ on the surface of the observation object can be detected by using one of the following equations:

$$\Phi(x, y) = k \cdot \{(1-\cos\theta)\cdot d(x, y)\}/\{2 \sin\theta \cdot S(x, y)\} \quad (3)$$

$$\Phi(x, y) = k \cdot \tan^{-1}[\{(1-\cos\theta)\cdot d(x, y)\}/\{2 \sin\theta \cdot S(x, y)\}] \quad (4)$$

In the detection apparatus of the present invention, as a fifteenth method, the same procedure as in the thirteenth method is carried out to acquire differential image information and summed image information. When $L(x, y)$ represents image formation in which the minimum in the summed image information $S(x, y)$ is enveloped, the detection of the amount of phase $\Phi(x, y)$ on the surface of the observation object becomes possible by using either of the following equations:

$$\Phi(x, y) = k \cdot \{(1-\cos\theta)\cdot d(x, y)\}/\{2 \sin\theta \cdot L(x, y)\} \quad (5)$$

$$\Phi(x, y) = k \cdot \tan^{-1}[\{(1-\cos\theta)\cdot d(x, y)\}/\{2 \sin\theta \cdot L(x, y)\}] \quad (6)$$

In the detection apparatus of the present invention, as a sixteenth method, amounts of retardation between the two polarized components split in the illumination optical system are detected to form two differential interference images in which the amounts of retardation between the polarized components are equal, but signs are different and a differential interference image in which the amount of retardation between the polarized components is zero. Subsequently, in these two differential interference images, a differential calculation and a summed calculation are performed on each set of opposite pixels to acquire differential image information and summed image information. When $0(x, y)$ represents the image information where the amount of retardation between the polarized components is zero, the amount of phase $\Phi(x, y)$ on the surface of the observation object can be detected by detecting a differential value $\partial \Phi(x, y)/\partial r$ of the amount of phase on the observation object corresponding to a direction of separation r between the two polarized components to perform integral processing in the direction r, using either of the following equations:

$$\partial\Phi(x, y)/\partial r = k \cdot \{(1-\cos\theta)\cdot D(x, y)\}/\{2 \sin\theta \cdot B(x, y)\} \quad (7)$$

$$\partial\Phi(x, y)/\partial r = k \cdot \tan^{-1}[\{(1-\cos\theta)\cdot D(x, y)\}/\{2 \sin\theta \cdot B(x, y)\}] \quad (8)$$

where $B(x, y) = S(x, y) - 2 \cdot 0(x, y)$.

In the detection apparatus of the present invention, as a seventeenth method, the same procedure as in the sixteenth method is carried out to acquire differential image information and summed image information. In this way, the amount of phase $\Phi(x, y)$ on the surface of the observation object can be detected, using either of the following equations:

$$\Phi(x, y) = k \cdot \{(1-\cos\theta)\cdot d(x, y)\}/\{2 \sin\theta \cdot B(x, y)\} \quad (9)$$

$$\Phi(x, y) = k \cdot \tan^{-1}[\{(1-\cos\theta)\cdot d(x, y)\}/\{2 \sin\theta \cdot B(x, y)\}] \quad (10)$$

Also, $d(x, y)$ and $B(x, y)$ are as defined in the fourteenth and sixteenth methods, respectively.

In the detection apparatus of the present invention, as an eighteenth method, the same procedure as in the sixteenth method is followed to acquire differential image information and summed image information. When $b(x, y)$ denotes the image information in which the minimum in $\{S(x, y) - 2 \cdot 0(x, y)\}$ is enveloped, the amount of phase $\Phi$ on the surface of the observation object can be detected, using either of the following equations:

$$\Phi(x, y) = k \cdot \{(1-\cos\theta)\cdot d(x, y)\}/\{2 \sin\theta \cdot b(x, y)\} \quad (11)$$

$$\Phi(x, y) = k \cdot \tan^{-1}[\{(1-\cos\theta)\cdot d(x, y)\}/\{2 \sin\theta \cdot b(x, y)\}] \quad (12)$$

The present inventor gives a detailed description of the imaging characteristics of the differential interference microscope in Hei 9-15504, ranging from the introduction thereof to the result. When an image intensity distribution in the differential interference microscope is represented by $I(x, y, \theta)$, the transmittance (reflectance) of light relative to the observation object by T (x, y), the phase information of the differential interference microscope by P (x, y), and the intensity information of an image by A (x, y), the characteristics of the differential interference microscope can be approximately expressed as $$I(x, y, \theta) = T(x, y)\{(1 - \cos\theta) \cdot A(x, y)/2 + \sin\theta \cdot P(x, y)\} \quad (13)$$

Substitution of $-\theta$ for $\theta$ in Eq. (13) gives $$I(x, y, -\theta) = T(x, y)\{(1 - \cos\theta) \cdot A(x, y)/2 - \sin\theta \cdot P(x, y)\} \quad (14)$$

Subtraction of Eq. (14) from Eq. (13) and addition of Eq. (13) to Eq. (14) lead to the following expressions:

$$I(x, y, \theta) - I(x, y, -\theta) = 2T(x, y) \cdot \sin\theta \cdot P(x, y) \quad (15)$$

$$I(x, y, \theta) + I(x, y, -\theta) = T(x, y) \cdot (1 - \cos\theta) \cdot A(x, y) \quad (16)$$

Thus, by acquiring the differential image information and the summed image information, the phase information and the image intensity information can be separated from the differential interference image.

Furthermore, when the phase information is extracted from the differential interference image, image information corresponding to a phase change of the observation object can be obtained. In particular, since the phase information of the differential interference image is correlative to the differential value of the phase distribution of the observation object, a predetermined value is derived from the phase information of the image, and thereby the gradient of the observation object corresponding to the predetermined value can be detected.

In this way, as described in the first method, the differential image is obtained from the two differential interference images in which the amounts of retardation between the polarized components are equal, but signs are different, and image information in a predetermined range is extracted from the differential image. Thus, the gradient of the observation object can be easily detected. By systematizing this technique, an apparatus for detecting the gradient of the observation object can be constructed.

Where the transmittance (reflectance) T (x, y) of the observation object is close upon 1, the gradient of the observation object can be detected with satisfactory accuracy only by acquiring the differential image information. In general, when the ratio between Eqs. (15) and (16) is calculated, the influence of the transmittance T (x, y) can be excluded.

Hence, as mentioned in the second method, the differential image and the summed image are obtained to find the ratio between them, and thereby, after the influence of the transmittance or reflectance of light on the observation object is excluded, the gradient of the observation object can be detected. Furthermore, by systematizing this technique, an apparatus for detecting the gradient of the observation object can be constructed.

As mentioned in the third method, when an image area in a predetermined range, with a zero value as a center, is derived from the image information obtained by the first or second method, an area where a phase gradient is nearly zero can be derived. This is equivalent to the fact that a portion or a planar portion which does not undergo a phase change is detected from the observation object. It is for this reason that when a curved surface or a spherical surface exists on the observation object, a portion close to its crest and a portion which does not produce the phase change can be thought of as planar surfaces. Moreover, if wear, deformation, or degeneration is caused to the curved surface or the spherical surface of the observation object, its crest portion will also undergo a change.

Thus, as in the third method, a portion or a planar portion which does not produce the phase change is detected, and thereby the wear, deformation, or degeneration of the observation object can also be detected. Furthermore, when this technique is systematized, an apparatus for detecting the wear, deformation, or degeneration of the observation object can be constructed.

As described in the fourth method, when the area or contour of the portion or the planar portion which does not undergo the phase change is determined and compared with that of a sample preset as a reference, it becomes possible to measure quantitatively the wear, deformation, or degeneration of the observation object. In addition, correlative detection is made and thereby the detection of defects is also possible. When this technique is automated, a detection apparatus for carrying out the fourth method can be constructed.

As specific examples of observation objects may be cited minute projections called bumps for intimate contact prevention of a magnetic head, formed on the surface of a magnetic disk; spherical conductors formed on an IC chip or the leadframe of an IC; and spherical conductors formed on the substrate of a semiconductor. The fourth method is thus applied, and thereby, when the observation object is homogeneous, a degenerated portion is detected and therefore a relative defect can be detected. For example, it is possible to detect the degeneration of liquid crystal cells and electrodes used in displays.

The use of a differential interference microscope for detecting the edge of a step is disclosed in Hei 7-239212. This publication, however, does not in any way suggest the imaging characteristics of the differential interference microscope, and merely describes the fact that since the contrast of interference fringes is varied by a phase change caused by the step height, the edge can be detected. Actually, when the edge of the step is observed through a microscope, it can be recognized that light is scattered at the edge. As such, when the edge of the step is observed through the differential interference microscope, it is verified that the value of brightness of the differential interference image in a portion where the step height changes from a convexity to a concavity is not identical in terms of an absolute value with that in a portion where it changes from a concavity to a convexity.

It is conceivable that this is because a scattered light component at the edge is added to the differential interference image. Therefore, scattered light at the edge is thought of as devoid of polarization characteristics, and when the scattered light component at the edge is represented by N (x, y), Eq. (13) is expressed as $$I(x, y, \theta) = T(x, y)\{(1-\cos\theta) \cdot A(x, y)/2 + \sin\theta \cdot P(x, y)\} + N(x, y) \quad (17)$$

Even when Eq. (17) is used, the differential image information as in the case of Eq. (13), is expressed by Eq. (15).

The summed image information is given by $$I(x, y, \theta) + I(x, y, -\theta) = T(x, y)\{(1 - \cos\theta) \cdot A(x, y) + 2N(x, y)\} \quad (18)$$

However, the scattered light component is thought of as very faint compared with the intensity component of the image, and thus there is no problem even though Eq. (16) is approximately used instead of Eq. (18).

In this way, the differential image information is extracted and thereby phase information correlative to a phase change of the edge of the observation object can be extracted. Specifically, when both the minima and the maxima of the image information are obtained to extract the phase information from the differential image, the edge of the step can be detected. The phase information to be extracted is such that the value of brightness of the differential interference image in a portion where the step height changes from a convexity to a concavity is nearly identical in terms of an absolute value with that in a portion where it changes from a concavity to a convexity. Hence, image information taken as the absolute value of the image information of the differential image formed as in the fifth method is derived to extract an image area exceeding a predetermined threshold from this image formation, thereby allowing the edge of the step to be detected.

As stated in the sixth method, the ratio of image information between the differential image and the summed image which have been obtained is calculated every pixel, and thereby an adverse influence of the transmittance or reflectance of light on the observation object can be excluded, Moreover. When the absolute value of the result obtained by the calculation is taken to find the image information in which a portion exceeding a predetermined threshold is formed, the edge of the step can be accurately detected.

In addition, when the pixel data of the differential image formed are squared to form the square image of the differential image information, a portion where the image intensity changes abruptly as in the edge of the step brings about a more considerable change in intensity. By doing so, the accuracy of the sixth method of setting a predetermined threshold to detect a portion exceeding this threshold can be further improved.

The image captured by the photographing means is generally treated as integer data of a 256-step image ranging from 0 to 255 steps every pixel. Where the differential image is formed, integer data of a 512-step image ranging from –255 to 255 steps are used. Even when the integer data are squared as they are, edge detection can be favorably made. A way to improve the accuracy of the edge detection is that a value is set between the maximum and the minimum of the differential image which has been formed, and image data of the differential image are divided by this value and are digitized. In this way, the image data of the differential image include a region below 1 and a region above 1. When a value more than 1 is set as a threshold, the accuracy of the edge detection can be improved. Thus, by using the seventh method, the edge of the surface split can be detected more accurately.

As described in the eighth method, the ratio of image information between the differential image and the summed image is found, and after an adverse influence of the transmittance or reflectance of light on the observation object is excluded, an image divided by a value between the maximum and the minimum in the image information is formed. Consequently, the influence of noise on an imager can be removed, and the edge of the step can be detected with a high degree of accuracy.

The ninth method is an application example of each of the fifth to eighth methods. In this method, a coordinate system is set on a photographed image so that the information of a detected edge corresponds to the coordinates of the image. The observation object is relatively moved until the coordinates of the edge are superimposed on predetermined coordinates, and thereby the observation object is positioned.

Where the detected edge has a specific size and occupies a certain extent of region, the center or the center of gravity of the coordinates of the region in one or two directions is found, and the value of the center or the center of gravity is set as a representative point. In this way, the observation object can be positioned. Also, as mentioned in the ninth and tenth methods, the edge that forms the differential image is detected, and thereby the observation object can also be positioned.

As in the positioning of the observation object, two specific regions are set from detected edge information, and a distance between the two regions is calculated from the coordinates of the two regions and is converted into a distance on the surface of the observation object by using a parameter such as an optical magnification of the imaging optical system. In this way, a distance between two preset points on the observation object can be measured. Thus, as mentioned in the eleventh and twelfth methods, when the differential image is formed and its edge is detected, the edge distance or length of the observation object can be obtained.

Although reference has been made to the fifth to twelfth methods in the disclosure so far, each of these methods is automated and thereby is easily applied to the detection apparatus.

The image where the amount of retardation between the polarized components is zero is considered representative of the scattered light component N (x, y) at the edge in Eq. (17). Hence, an image formed by subtracting an image doubling the image information in which the amount of retardation between the polarized components is zero from the summed image, is displaced with the summed image to find the ratio between the summed image and the differential image. By doing so, the edge is detected with a higher degree of accuracy.

A technique of combining a fringe scanning method used for interference measurement with the operation of the differential interference microscope to measure the phase distribution of the observation object is disclosed in Hei 5-149719. In general, where this fringe scanning method is combined with the differential interference microscope, our differential interference images in which the amounts of retardation between the polarized components are 0, $\pi/2$, $\pi$, and $3\pi/2$ are captured, and each of pixel data of these images is used to perform a calculation on the following equations:

$$\tan^{-1}\left[\{I\,(\pi/2)-I\,(3\pi/2)\}/\{I\,(0)-I\,(\pi)\}\right] \tag{19}$$

In this way, the phase information of the observation object is acquired.

The fringe scanning method for interference measurement is used on the premise that the diffraction and scattering of light are not produced on the surface of the observation object. In the differential interference microscope, however, light diffracted on the surface of the object is converted into a differential interference image, and thus as shown in Eq. (13), an image combining the phase information with the intensity information is obtained.

When images in which the amounts of retardation $\theta$ between the polarized components are $\pm\pi/2$ are captured to form a differential image and a summed image, information corresponding to the term I ($\pi/2$)–I ($3\pi/2$) in Eq. (19) is derived from the differential image. In the differential interference microscope, therefore, the images of $\theta=\pm\pi/2$ are used and thereby the same information as in the fringe scanning method is obtained. Also, for any amount of retardation $\theta$, the same effect is secured.

Hence, as mentioned in the thirteenth method, the amount of retardation between the polarized components is detected by the differential interference microscope so that the differential image and the summed image are formed from two differential interference images in which the amounts of retardation between the polarized components are equal, but signs are different. In this way, the ratio between the images are calculated every pixel to find the value of the arc tangent, and thereby the differential value of the amount of phase in a shearing direction of the observation object can be detected. Furthermore, by finding an integral value in a shearing direction of the differential value, the amount of phase at each point of the observation object can be measured quantitatively with a higher degree of accuracy.

Since the intensity distribution of the differential interference image varies with the amount of shear of an observation object or a differential interference microscope, the image is captured with the amount of retardation that yields the best intensity for phase detection, and thereby a measurement with high accuracy becomes possible.

Where the amount of phase to be detected is small, the differential value of the amount of phase can be approximately obtained even though the value of the arc tangent is not required, and the amount of phase can also be obtained by integral processing. Since, in this case, the phase distribution of the observation object is derived from the two differential interference images, time required for measurement can be reduced, compared with the case of a conventional fringe scanning method.

In the differential interference microscope, when the amounts of retardation between the polarized components are 0 and π, the intensity distributions of the images vary widely. Thus, when the fringe scanning method is applied, an imager whose dynamic range is very wide is required.

In the present invention, an image in which the amount of retardation between the polarized components is π is not particularly required, and thus even when the imager whose dynamic range is very wide is not used, the measurement is possible.

When the differential interference microscope is used to measure the phase distribution of the observation object, all of light diffracted by the observation object cannot be obtained as image information because the pupil diameter of the differential interference microscope is finite. The imaging characteristics of the differential interference microscope are expressed by Eq. (13). The phase information P (x, y) and the image intensity information A (x, y), as shown in the following equations, are convoluted by a peculiar, optical transfer function. As such, in order to accurately find the phase information of the observation object, it is necessary to consider the optical transfer function of the differential interference microscope.

$$P(x, y) = \int_{-\infty}^{\infty}\int_{-\infty}^{\infty} \sin\{\pi(\Delta_x f_x + \Delta_y f_y)\} M(f_x, f_y) \Phi(f_x, f_y) \cdot \\ \exp\{2i\pi(f_x x + f_y y)\} df_x df_y \quad (20)$$

$$A(x, y) = 1 - \int_{-\infty}^{\infty}\int_{-\infty}^{\infty} \cos\{\pi(\Delta_x f_x + \Delta_y f_y)\} M(f_x, f_y) \cdot \\ \Phi(f_x, f_y) \otimes \Phi^+(f_x, f_y) \exp\{2i\pi(f_x x + f_y y)\} df_x df_y + \\ \int_{-\infty}^{\infty}\int_{-\infty}^{\infty} T(f_x, f_y) \Phi(f_x, f_y) \Phi^+(-f_x, -f_y) \cdot \\ \exp\{4i\pi(\Delta_x f_x + \Delta_y f_y)\} df_x df_y \quad (21)$$

where $$M(f_x, f_y) = \int_{-\infty}^{\infty}\int_{-\infty}^{\infty} Q(\xi, \zeta) R(\xi, \zeta)^+ R(\xi + f_x, \zeta + f_y) d\xi d\zeta$$

$$T(f_x, f_y) = \int_{-\infty}^{\infty}\int_{-\infty}^{\infty} Q(\xi, \zeta) R(\xi + f_x, \zeta + f_y) \\ R^+(\xi - f_x, \zeta - f_y) d\xi d\zeta$$

Here, Q (ξ, ζ) is the pupil function of the illumination optical system, R (ξ, ζ) is the pupil function of the imaging optical system, Δx and Δy are an x component and a y component, respectively, of the amount of shear, and fx and fy are spatial frequencies in x and y directions, respectively.

In the present invention, however, as stated in the fourteenth method, the differential image is such that the optical transfer function corresponding to the phase information of the differential interference microscope shown in Eq. (20) are used and deconvolution processing is performed to find the difference with the summed image. In this way, the amount of phase of the observation object can be accurately obtained even though integral processing is not performed.

However, if the amount of phase of the observation object is larger than that of a weak phase region, influences of the second and third terms of Eq. (21) become considerable. In order to accurately find the amount of phase of the observation object, it is necessary to detect zero-order light which is not diffracted or scattered by the observation object. However, in view of the intensity, the light can be actually detected only in a state where it is mixed with diffracted or scattered light and hence a zero-order light component must be separated from the intensity information.

The separation of the zero-order light component can be done by Fourier-transforming image intensity information to extract only a low frequency. It is conceivable that the zero-order light component, of the image intensity information, is a portion having the minimum value. In this way, as in the fifteenth method, the summed image is formed and thereby the image intensity information is extracted to find the minimum value of the summed image. Subsequently, by finding the ratio between the image information L (x, y) enveloping the minimum value and the image information d (x, y) deconvoluting the differential image, the detection accuracy of the amount of phase of the observation object can be improved.

Although reference has been made to the thirteenth to fifteenth methods, each of these methods is automated and thereby is easily applied to the detection apparatus. This brings about a reduction in detection time and the effect that the influence of the dynamic range on the imager detecting the differential interference images is lessened Where a phase change of the observation object is relatively great and the edge of the step exists, the scattering of light is produced at the edge. This scattering may be responsible for degradation in accuracy of phase detection. In order to exclude the influence of the scattering, as mentioned in the sixteenth method, an image where the amount of retardation between the polarized components is zero and images where the amounts of retardation between the polarized components are ±θ are picked up, three in total. Subsequently, the value of B (x, y)=S (x, y)−2·0 (x, y) is derived from the summed image information S (x, y) which is obtained from the images where the amounts of retardation between the polarized components are ±θ and the image information 0 (x, y) where the amount of retardation is zero, to acquire the ratio between the differential image information D (x, y) and B (x, y). In this way, the scattered light at the edge can be removed.

As described in the seventeenth method, deconvolution processing is performed as in the fourteenth method, and thereby phase detection can be made, taking account of the influence of the optical transfer function of the differential interference microscope. Moreover, as stated in the eighteenth method, the image information enveloping the minimum value of the summed image information is extracted to find the ratio with the deconvolution image of the differential image. Consequently, the phase detection can be made, excluding the influence of the scattered light at the edge.

In accordance with the embodiments shown, the present invention will be described in detail below.

First Embodiment

This embodiment provides a method of detecting a minute projection (bump) for intimate contact prevention of a magnetic head formed on the surface of a magnetic disk. The first embodiment uses a detection apparatus incorporating a reflection type differential interference microscope to observe a metallic object.

The detection apparatus of the first embodiment, as shown in FIG. 1, is constructed with a differential interference microscope 4 comprised of a light source 1, an illumination optical system 2, and an imaging optical system 3; a CCD camera 5 for photographing an image obtained by the differential interference microscope 4; and a microcomputer 6 for performing a calculation on the image photographed by the CCD camera 5.

The illumination optical system 2 includes, in order from the side of the light source 1, a lens 7, stops 8, a lens 9, a polarizer 10, a quarter-wave plate 11, a half mirror 12, a Nomarski prism 13, and an objective unit (objective lens) 14. The imaging optical system 3 includes, in order from the side of an observation object 15, the objective unit 14, the Nomarski prism 13, the half mirror 12, an analyzer 16, and a lens 17. The illumination optical system 2 has the half mirror 12, as well as the Nomarski prism 13 and the objective unit 14, in common with the imaging optical system 3.

In the detection apparatus shown in FIG. 1, light emitted from the light source 1, after being polarized through the polarizer 10, is transmitted through the quarter-wave plate 11 and is reflected downwardly by the half mirror 12. This reflected light is transmitted through the objective unit 14 through the Nomarski prism 13 placed so that a separation point between an ordinary ray and an extraordinary ray is localized at the pupil position of the objective unit 14. In this way, the ordinary and extraordinary rays are separated by a predetermined amount of shear on the observation object 15. The ordinary and extraordinary rays reflected by the observation object 15 are again transmitted through the objective unit 14 and then are recombined by the Nomarski prism 13. Further, these rays, after being transmitted through the half mirror 12, is transmitted through the analyzer 16. Consequently, the ordinary and extraordinary rays interfere with each other to form a differential interference image of the observation object 15 through the lens 17 on the image pickup surface of the CCD camera 5.

Here, the polarizer 10 is rotatable about the optical axis. Moreover, the polarizer 10 is connected to a pulse motor 18, which can be controlled by the microcomputer 6 so that the angle of rotation of the polarizer 10 can be arbitrarily set. As such, the rotation of the pulse motor 18 is controlled by the microcomputer 6, and thus the amount of retardation between the polarized components can be set by the polarizer 10. The quarter-wave plate 11 is fixed so that the orientation of its fast axis or slow axis coincides with that of polarization of the analyzer 16.

In the first embodiment, a reference mirror is first placed, instead of the observation object 15, to make observation, and the microcomputer 6 is operated to derive an image intensity distribution while rotating the polarizer 10 and find the angle of rotation of the polarizer 10 and a change in the amount of retardation between the polarized components.

Subsequently, instead of the mirror, a magnetic disk is placed as the observation object 15, and the polarizer 10 is rotated and set so that the amount of retardation between the polarized components becomes a predetermined value $\theta$, to capture an image of the magnetic disk. The amount of retardation $\theta$ between the polarized components in this case is preset to a value which is thought of as optimum by observing a typical magnetic disk.

The polarizer 10 is then rotated so that the amount of retardation between the polarized components is $-\theta$, to capture another image. A differential image is formed from two images thus obtained to extract phase information. Furthermore, a portion close to a zero value is extracted from the differential image, and the portion close to a zero value and a portion other than this portion are formed into a binary image.

Figure 2A:
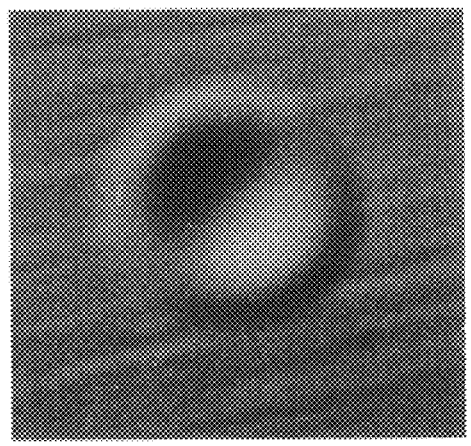
FIGS. 2A and 2B are photographs showing differential interference images relative to the observation object where the apparatus of FIG. 1 is used and the amounts of retardation between polarized components obtained by a technique described in the first embodiment are $\theta$ and $-\theta$, respectively.
Figure 2B:
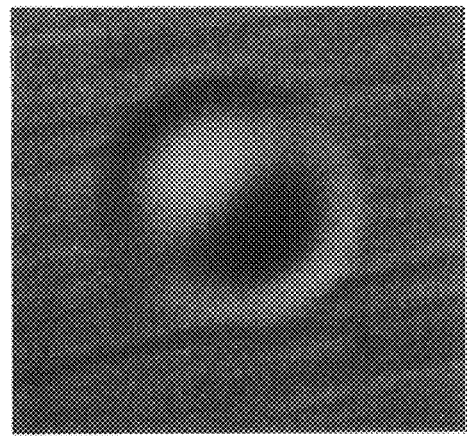
Figure 2C:
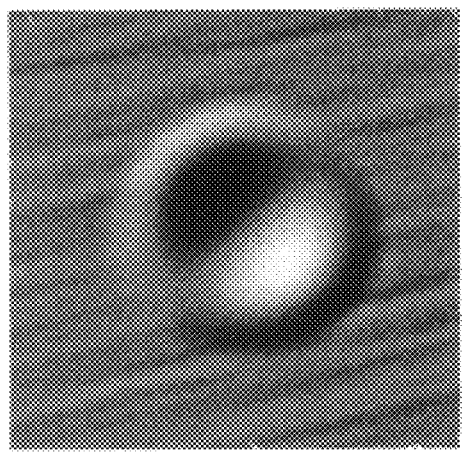
FIG. 2C is a photograph showing a differential image derived from the images of FIGS. 2A and 2B.
Figure 2D:
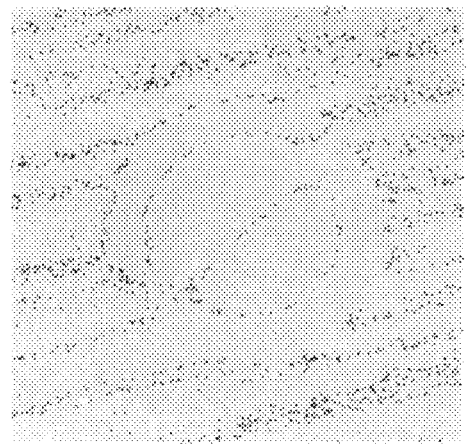
FIG. 2D is a photograph showing a binary image in which a value close to zero is derived from the differential image of FIG. 2C and a portion close to zero and a portion other than this are formed.

FIGS. 2A and 2B show differential interference images of bumps where the amounts of retardation between the polarized components are $\theta$ and $-\theta$. FIG. 2C shows a differential image formed to extract phase information (Here, to facilitate its display, the maxima and the minima are represented by a 256-step image). FIG. 2D shows a binary image in which a value close to a zero value is extracted from the differential image and a portion close to the zero value and a portion other than this portion are formed.

Figure 3:
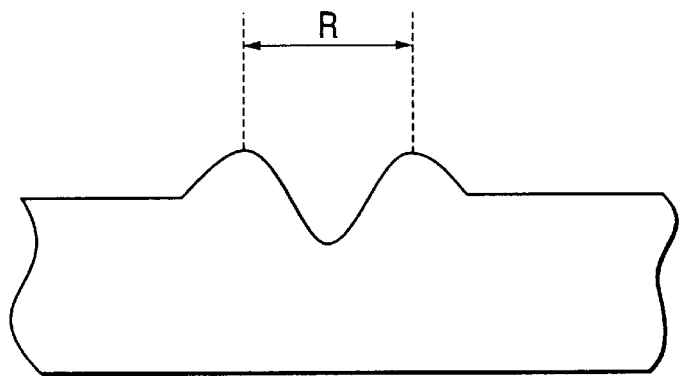
FIG. 3 is a sectional view showing a bump formed on a magnetic disk.

The section of a bump formed on the magnetic disk has a shape such as that illustrated in FIG. 3. Hence, the gradient of the bump becomes zero at its crest. However, if the bump is worn or deformed by a magnetic head, a planar portion of the crest will be deformed.

Figure 4:
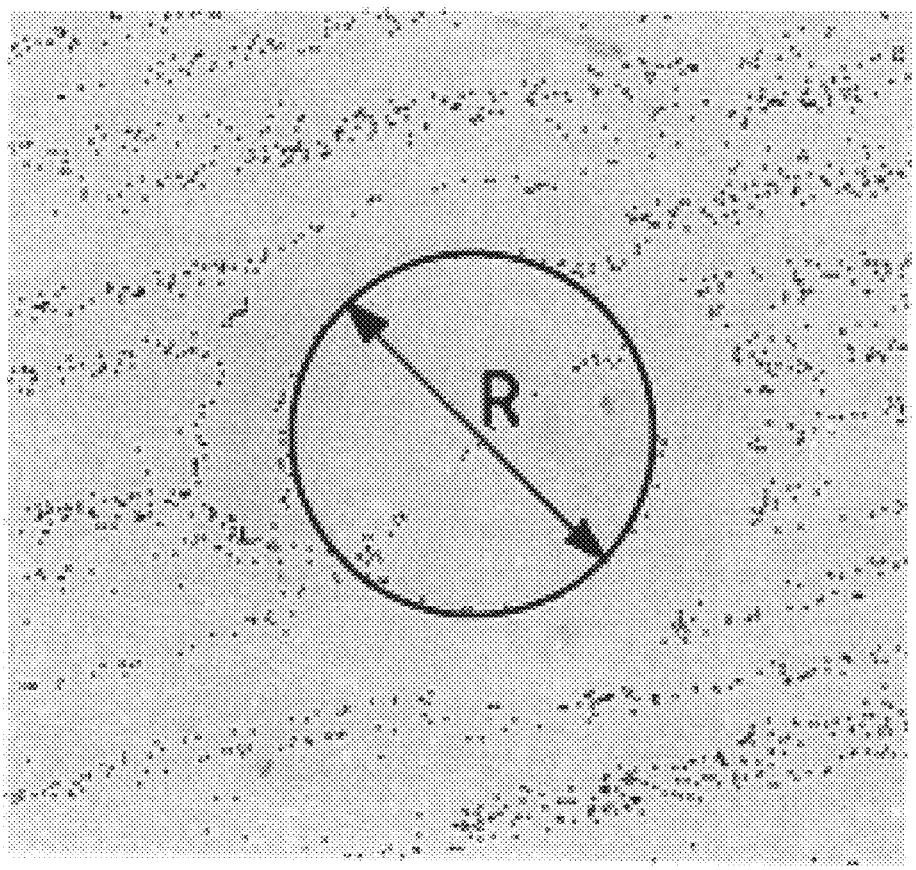
FIG. 4 is a view showing a state where a circle approximating the crest of the bump of FIG. 3 is drawn with respect to the image of FIG. 2D.

In the first embodiment, as shown in FIG. 4, a circle R closely approximating data of the crest is derived from the binary image of FIG. 2D to parameterize its radius or diameter, thereby allowing the extent of wear of the bump to be detected.

Since the magnetic disk is nearly uniform in reflectance of light, the phase information can be detected only by forming the differential image. However, for an observation object in which the reflectance of light is not uniform, a summed image is formed from the images shown in FIGS. 2A and 2B to acquire image information in which the ratio between the summed image and the differential image is calculated every pixel. In this way, the influence of a change of the reflectance of light on the magnetic disk can be excluded.

Although in the first embodiment reference has been made to the technique of detecting the bump of the magnetic disk, this technique is not limited to the detection of the bump. For example, it can also be used to inspect soldering balls of a ball grid array (BGA) formed on an IC chip or a leadframe. In this case, when the size of the soldering ball is changed, the area of its crest is also changed, and thus a planar portion is detected to parameterize the radius or area of an approximate circle. In this way, the size of the soldering ball can be detected. The detection of a change or defect in shape also becomes possible by detecting the crest.

In the first embodiment, the detection apparatus incorporating the reflection type differential interference microscope is used, but if a transmission type differential interference microscope is used, a homogeneous portion of a transmission sample can be detected. In this case, the homogeneous portion is detected and thereby an inhomogeneous portion can also be detected.

Second Embodiment

This embodiment provides a method of detecting the edge of a rugged sample (a box mark) for positioning a semiconductor wafer. A detection apparatus used, as in the first embodiment, incorporates the reflection type differential interference microscope shown in FIG. 1.

In the detection apparatus shown in FIG. 1, the microcomputer 6 is operated to rotate the polarizer 10, and the amount of retardation between the polarized components is varied to derive images in which the amounts of retardation between the polarized components are θ and −θ. Subsequently, a differential image is formed from these two images, and the absolute value of the differential image is found to set a predetermined threshold so that a binary image is formed with respect to portions above and below the threshold.

Figure 5A:
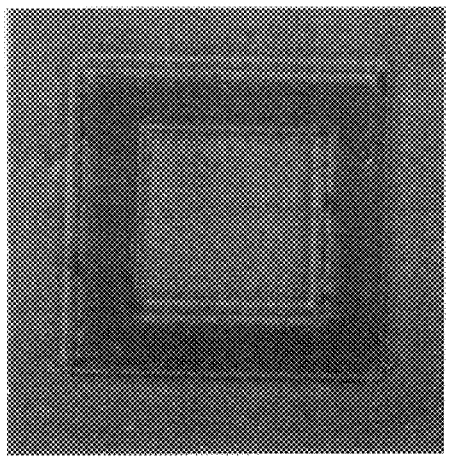
FIGS. 5A and 5B are photographs showing differential interference images relative to the observation object where the apparatus of FIG. 1 is used and the amounts of retardation between polarized components obtained by a technique described in a second embodiment are $\theta$ and $-\theta$, respectively.
Figure 5B:
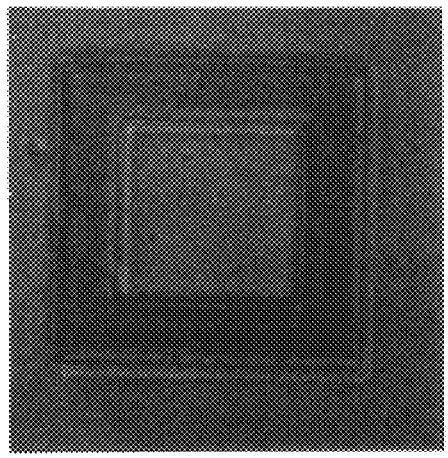
Figure 5C:
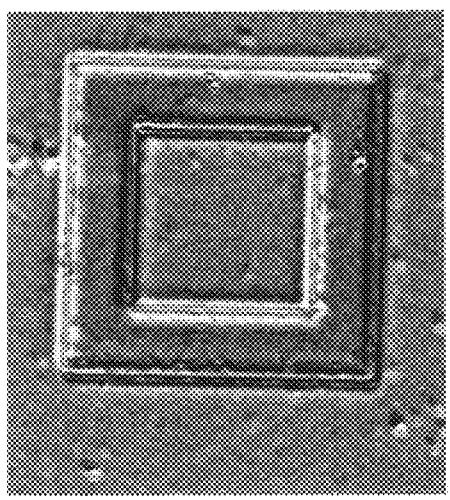
FIG. 5C is a photograph showing a differential image derived from the images of FIGS. 5A and 5B.
Figure 5D:
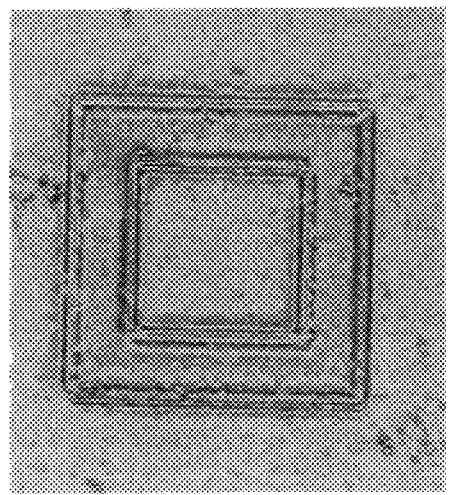
FIG. 5D is a photograph showing a binary image in which the absolute value of the differential image of FIG. 5C is set to a threshold and, based on this threshold, a portion over the threshold and a portion under the threshold are formed.

FIGS. 5A and 5B show differential interference images relative to the rugged sample where the amounts of retardation between the polarized components are θ and −θ. FIG. 5C shows a differential image formed to extract phase information (Here, to facilitate its display, the maxima and the minima are represented by a 256-step image). FIG. 5D shows a binary image in which the absolute value of the differential image is set as a threshold and portions above and below the threshold are formed.

Figure 6:
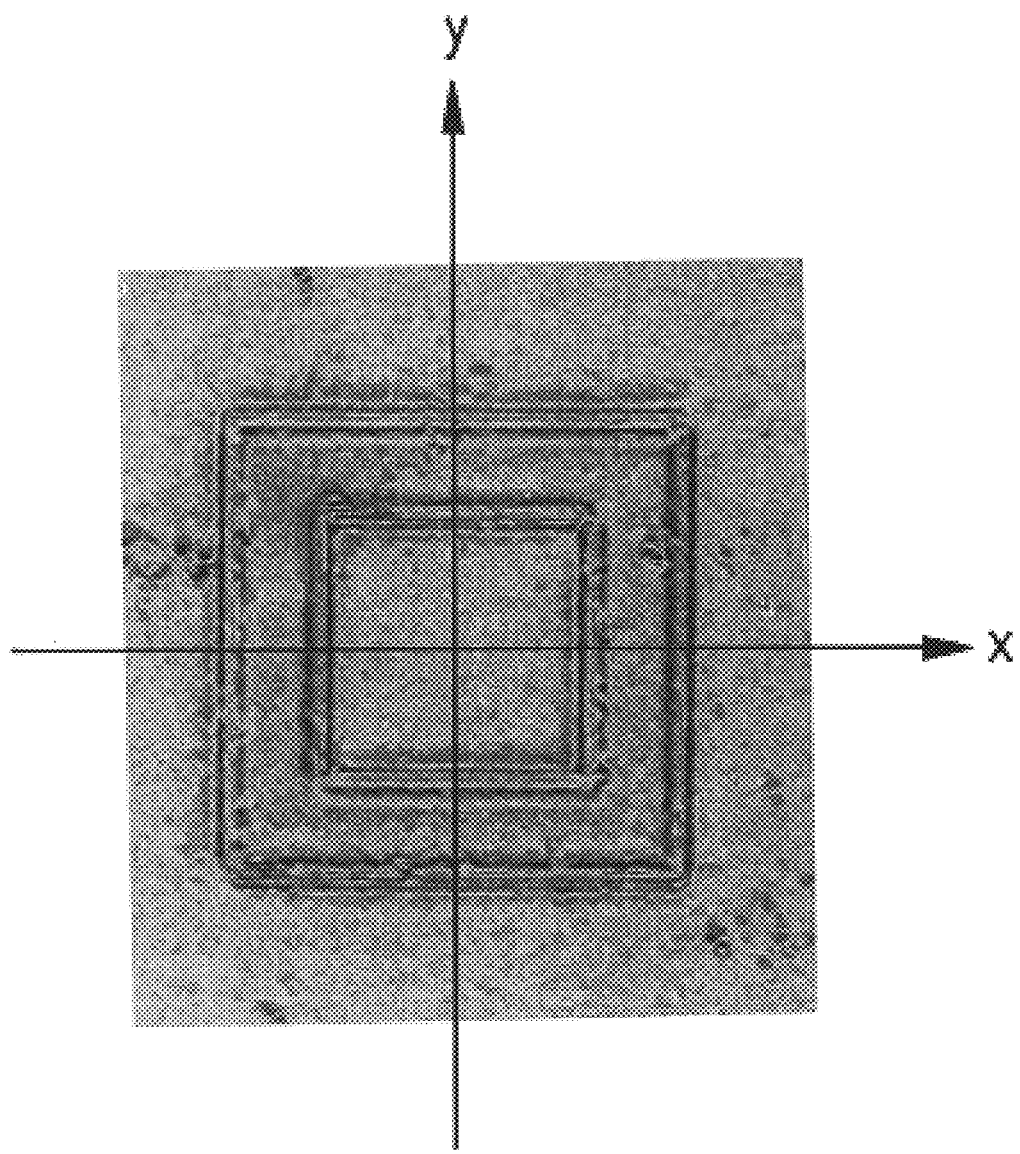
FIG. 6 is a view for explaining the procedure that detects the edge of the observation object through the technique of the second embodiment to position the observation object.

According to the second embodiment, the edges of the rugged sample can be detected from the image shown in FIG. 5D. As shown in FIG. 6, x-y coordinates are set on the image and the rugged sample is mounted on a two-dimensionally movable stage, corresponding to the x-y coordinates of the image. Consequently, the positioning of the rugged sample becomes possible.

Moreover, in the image shown in FIG. 6, a distance between the edges is measured and thereby the length of the rugged sample can be obtained.

Here, to improve the accuracy of positional detection of the edge, there is a technique of finding a reference position of an area exceeding the threshold obtained by the above-mentioned technique in the x-y coordinates of the image to set the reference position as a representative point of the edge, or a technique of detecting the maximum of the intensity value of an image in the area exceeding the threshold to set the coordinates of the edge on the basis of the maximum.

The second embodiment cites an example in which the absolute value of the differential image is set, but a predetermined value may be set between the maxima and the minima of the differential image so that the differential image is divided by this value. In this way, the differential image can be separated into areas above and below ±1. In addition, by squaring the value of each of pixel data of the differential image, each of the areas above ±1 has the image intensity value as large as more than 1 and the area below ±1 has the image intensity value as small as less than 1. Consequently, the signal of the edge can be made sharper and the accuracy of edge detection can also be improved.

Furthermore, since the rugged sample, like the magnetic disk, is nearly uniform in reflectance of light, the phase information can be extracted only by forming the differential image. However, for a rugged sample in which the reflectance of light is not uniform, a summed image is formed from the images shown in FIGS. 5A and 5B to obtain image information in which the ratio between the summed image and the differential image is calculated every pixel. In this way, the influence of a change of the reflectance of light on the rugged sample can be excluded. Also, this technique can be applied to the positioning and the measurement of length of an IC pattern.

The detection technique is used in the transmission type differential interference microscope and thereby can be applied to the positioning of transparent electrodes of a liquid crystal and the measurement of a distance between the transparent electrodes.

Third Embodiment

This embodiment provides a detection method using a phase grating on the measurement of the amount of phase of a phase object. In the third embodiment, a detection apparatus incorporating the transmission type differential interference microscope is employed.

Figure 7:
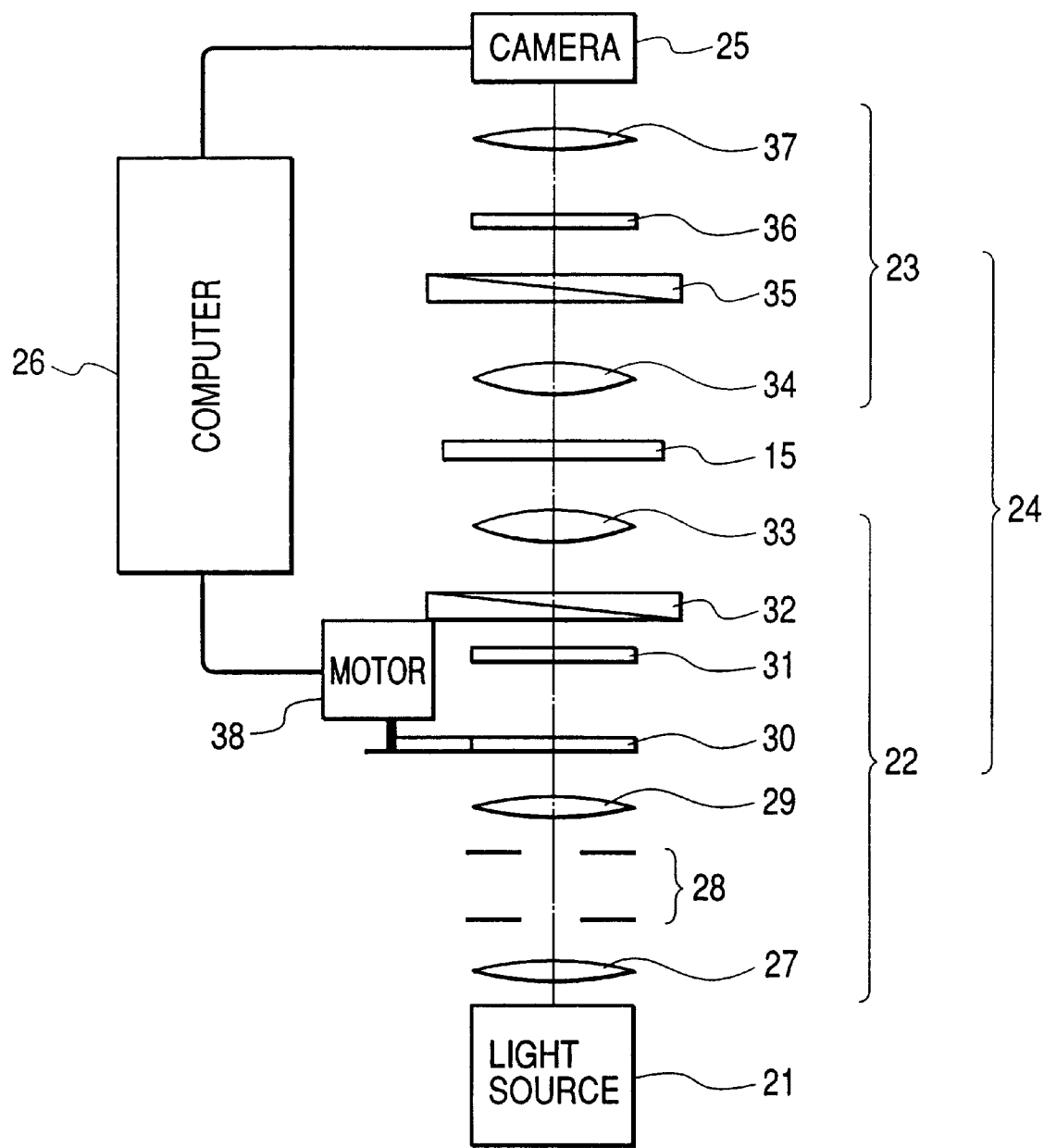
FIG. 7 is a view showing the arrangement of an apparatus for detecting various physical amounts relative to the observation object in a third embodiment of the present invention.

The detection apparatus used in the third embodiment, as shown in FIG. 7, is constructed with a differential interference microscope 24 comprised of a light source 21, an illumination optical system 22 and an imaging optical system 23; a CCD camera 25 for photographing an image derived from the differential interference microscope 24; and a microcomputer 26 for making a calculation on the image photographed by the CCD camera 25.

The illumination optical system 22 includes a lens 27, stops 28, a lens 29, a polarizer 30, a quarter-wave plate 31, a Nomarski prism 32, and a condenser lens 33. The imaging optical system 23 includes an objective unit (objective lens) 34, a Nomarski prism 35, an analyzer 36, and a lens 37.

In the detection apparatus shown in FIG. 7, light emitted from the light source 21, after being polarized by the polarizer 30, is transmitted through the quarter-wave plate 31. By the Nomarski prism 32 placed so that a separation point between an ordinary ray and an extraordinary ray is localized at the pupil position of the condenser lens 33, the ordinary and extraordinary rays are separated by a predetermined amount of shear, through the condenser lens 33, on the observation object 15. The ordinary and extraordinary rays transmitted through the observation object 15, after traveling through the objective unit (objective lens) 34, is recombined by the Nomarski prism 35 placed so that a combination point between the ordinary and extraordinary rays is localized at the pupil position of the objective unit (objective lens) 34. Subsequently, when the ordinary and extraordinary rays are transmitted through the analyzer 36, they interfere with each other to form the differential interference image of the observation object 15, through the lens 37, on the image pickup surface of the CCD camera 25.

In the third embodiment, an interference filter is placed in the light source 21 and is set so that illumination light to be emitted is quasi-monochromatic light with a wavelength of 550 nm. The polarizer 30 can be rotated about the optical axis. Moreover, the polarizer 30 is connected to a pulse motor 38, which can be controlled by the microcomputer 26 so that the angle of rotation of the polarizer 30 can be arbitrarily set. As such, the rotation of the pulse motor 38 is controlled by the microcomputer 26, and thus the amount of retardation between the polarized components can be set by the polarizer 30. The quarter-wave plate 31 is fixed so that the orientation of its fast axis or slow axis coincides with that of polarization of the analyzer 36.

In the third embodiment, first of all, a homogeneous phase object is observed to derive an image intensity distribution while rotating the polarizer 30 and find the rotation of the polarizer 30 and a change of the amount of retardation between the polarized components.

Subsequently, the polarizer 30 is rotated so that the amount of retardation between the polarized components is θ, to capture the image of the observation object 15. In this case, the angle of rotation of the polarizer 30 is detected by the microcomputer 26, and at the same time, the amount of retardation between the polarized components is stored in the microcomputer 26. Likewise, the polarizer 30 is rotated so that the amount of retardation between the polarized components is −θ, to capture the image of the observation object 15. In this case, the angle of rotation of the polarizer 30 is detected by the microcomputer 26, and at the same time, the amount of retardation between the polarized components is stored in the microcomputer 26. In this way, a differential image and a summed image are formed from two images in which derived amounts of retardation between the polarized components are θ and −θ.

Figure 8:
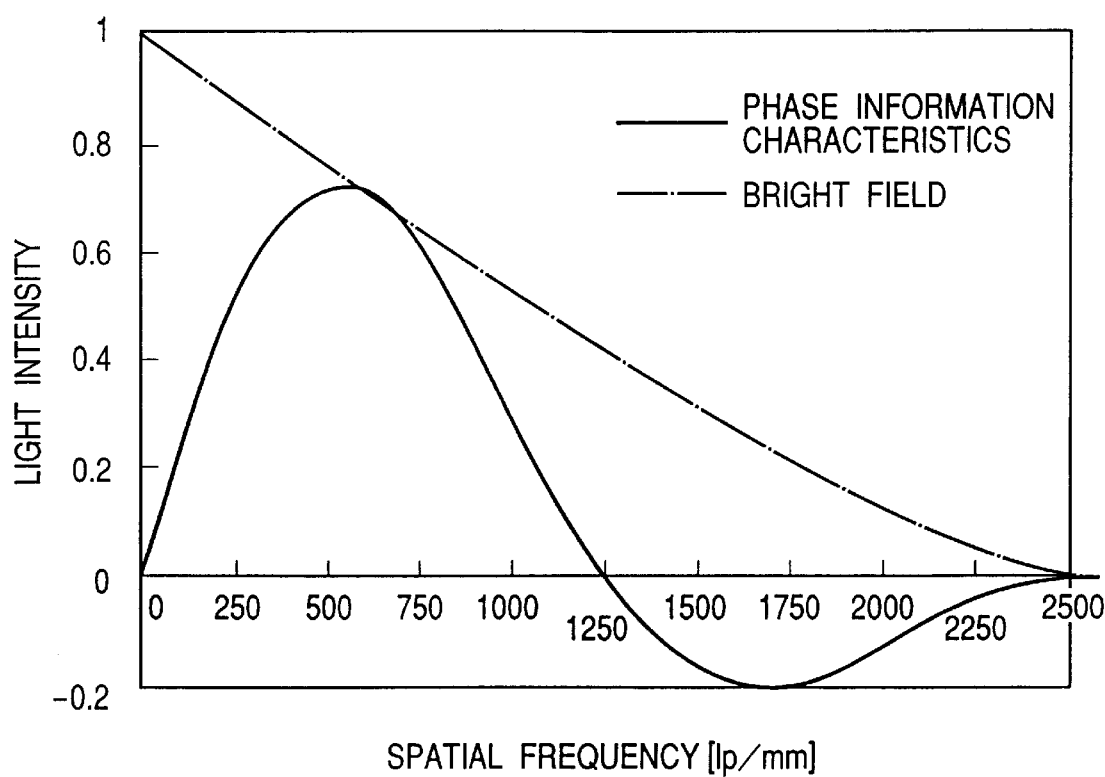
FIG. 8 is a graph showing the optical transfer function of a differential interference microscope.

Next, the differential image thus formed is deconvoluted in the microcomputer 26, using the optical transfer function of the differential interference microscope shown in FIG. 8, to form a phase information image taking account of a new optical transfer function. After that, image information obtained in this way is divided by the summed image to find the value of the arc tangent, which is multiplied by the following value derived from the amount of retardation θ between the polarized components which has been detected, for conversion into the phase distribution.

$$k \cdot (1 - \cos\theta)/2 \sin\theta \quad (22)$$

where $k = \lambda/2\pi$ (here, $\lambda = 550$ nm).

Figure 9A:
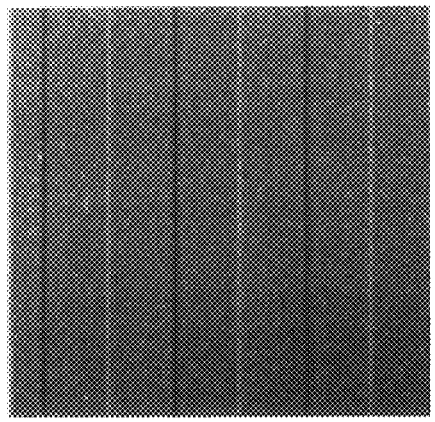
FIGS. 9A and 9B are photographs showing differential interference images relative to the observation object where the apparatus of FIG. 7 is used and the amounts of retardation between polarized components obtained by a technique described in the third embodiment are $\theta$ and $-\theta$, respectively.
Figure 9B:
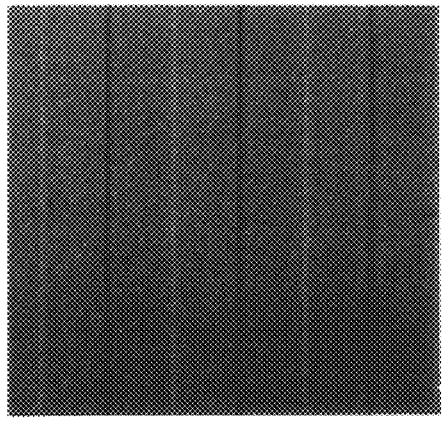
Figure 9C:
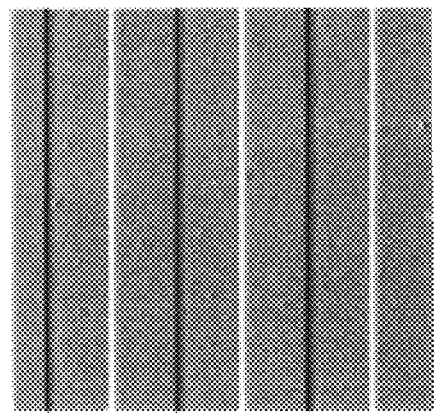
FIGS. 9C and 9D are photographs showing a differential image and a summed image, respectively, derived from the images of FIGS. 9A and 9B.
Figure 9D:
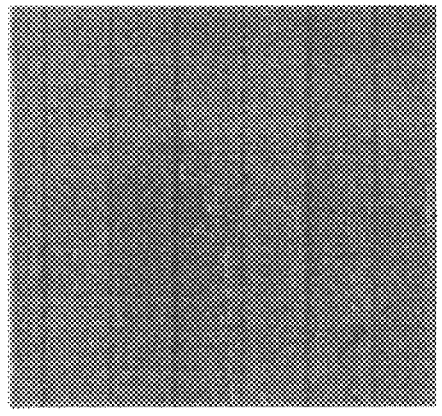
Figure 10A:
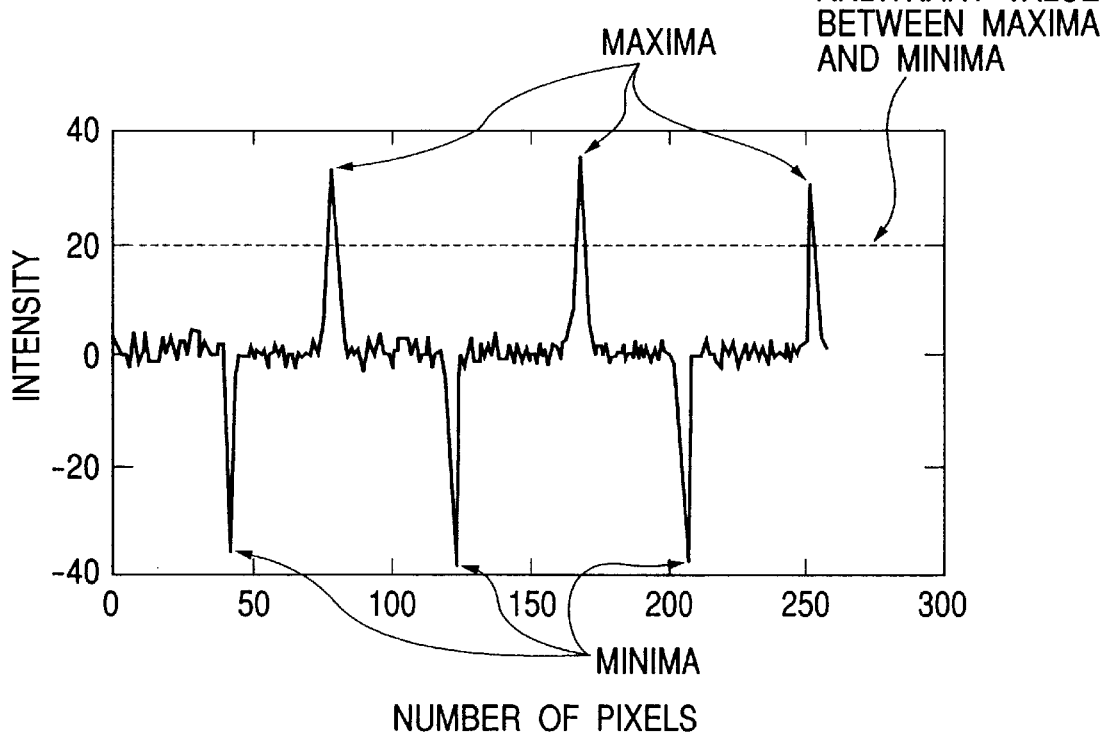
FIGS. 10A and 10B are views showing intensity distributions, each for one line, in FIGS. 9C and 9D, respectively.
Figure 10B:
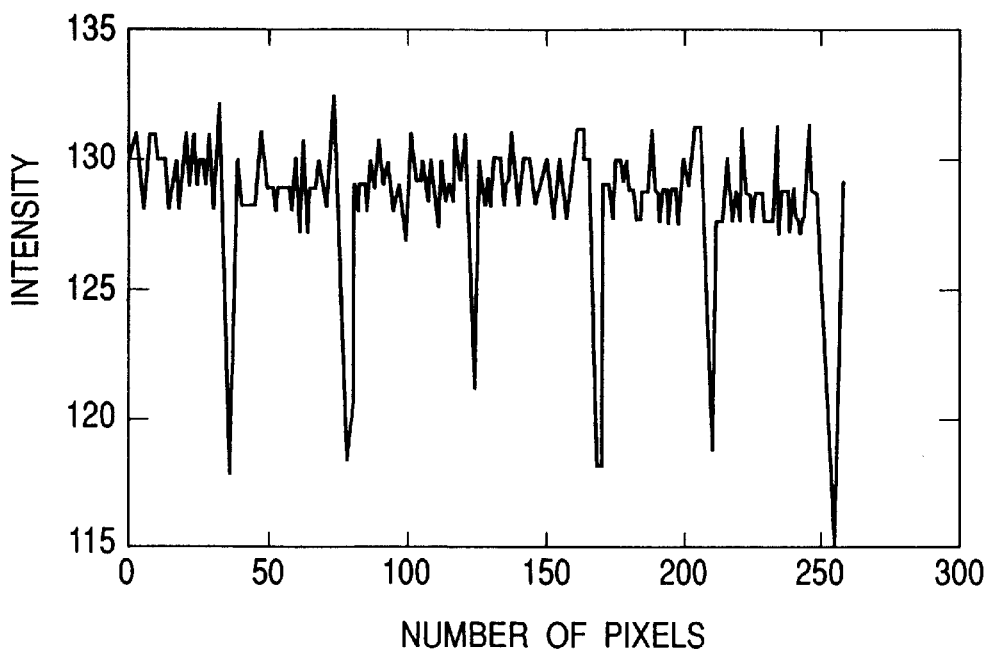

FIGS. 9A and 9B show images relative to the phase object where the amounts of retardation between the polarized components are θ and −θ, respectively. FIGS. 9C and 9D show a differential image and a summed image, respectively, formed from the images of FIGS. 9A and 9B. FIGS. 10A and 10B show image intensity distributions, each for one line, of the differential image and the summed image shown in FIGS. 9C and 9D, respectively. As seen from FIG. 10A, the differential image has peaks on the plus side and the minus side of an intensity of 0 in accordance with a portion where the step height changes from a convexity to a concavity and a portion where it changes from a concavity to a convexity. The maxima of the peaks on the plus side are nearly equal in absolute values to the minima of the peaks on the minus side. This shows that in the differential image, the intensity distribution of the differential interference image in the concavity and the convexity is symmetrical.

With the fifth method, a threshold is set in the intensity distribution of the differential image of FIG. 10A to derive an area exceeding the threshold, and thereby the edge of the observation object can be detected. In the seventh method, the differential image is divided every pixel by an arbitrary value between the maxima and the minima in the differential image (for example, a numerical value of 20 in FIG. 10A). Subsequently, a new image is produced by squaring the value of each pixel. A threshold is set in this new image to obtain an area exceeding the threshold, and thereby the edge of the observation object can be detected.

In FIG. 10A, the division is done by using the numerical value of 20, and the values of the peaks are smaller than 40 in terms of the absolute values. Thus, each value derived from the result of the division exists in an area smaller than 1 or an area between 1 and 2 with respect to the intensity. In this way, as mentioned in the second embodiment, the value of each pixel is squared and thereby the signal of the edge can be made sharper.

Figure 11:
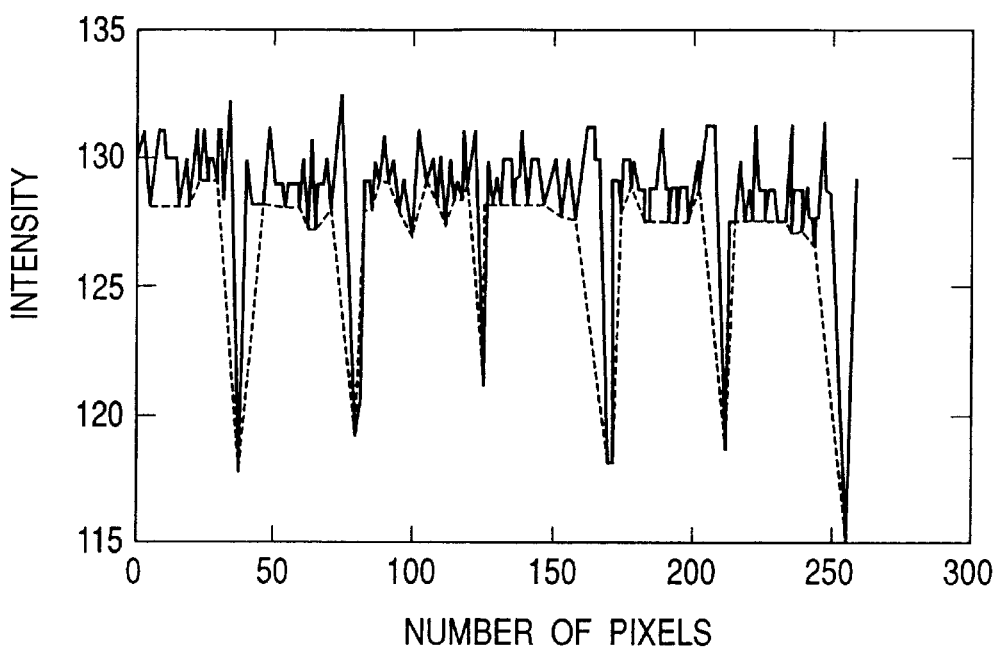
FIG. 11 shows a state where the minima of image intensity are enveloped.

In the fifteenth method, the values of individual pixels are compared and pixels smaller in value than adjacent pixels are extracted to obtain the minima, which are connected by a line as shown in FIG. 11. Such a line envelops the minima and can be used as image information. Thus, it is only necessary to divide the image information enveloping the minima by the image information deconvoluting the differential image. Alternatively, the arc tangent of image information obtained by the division may be derived.

Figure 12A:
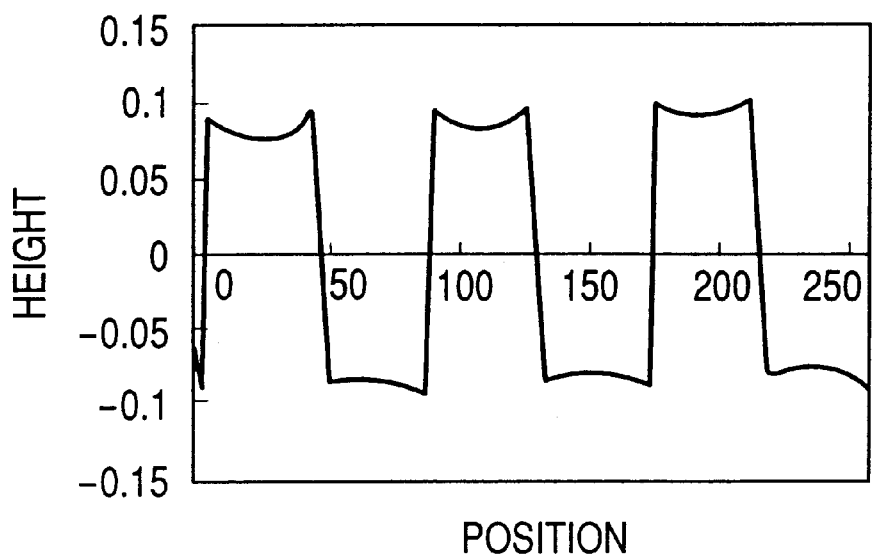
FIG. 12A is a view showing the reproduction of a phase distribution according to the present invention.
Figure 12B:
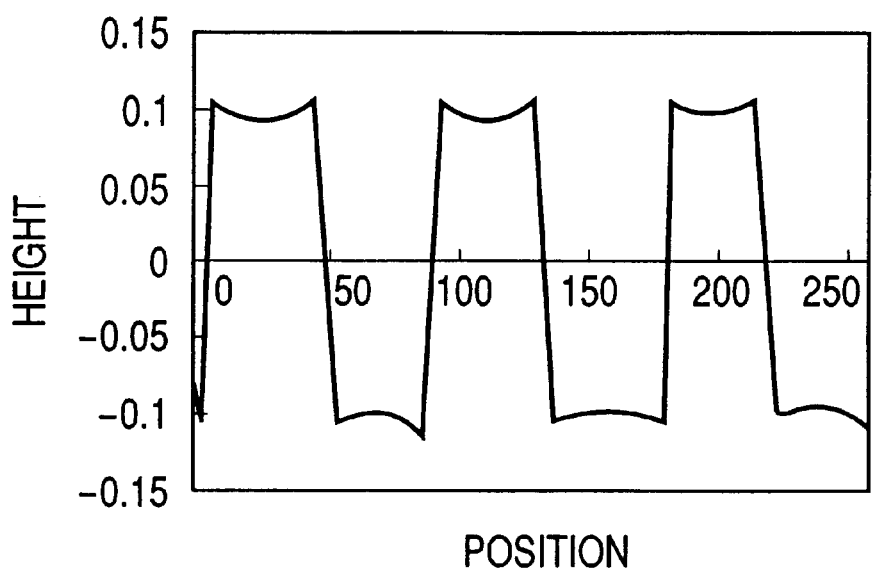
FIG. 12B is a view showing the reproduction of a phase distribution obtained by a conventional fringe scanning method.

FIG. 12A shows a phase distribution (the section of a grating) reproduced by the present invention. For reference, the section of a grating in which a conventional fringe scanning method is used and deconvolution processing is performed to reproduce a phase distribution is shown in FIG. 12B.

According to the third embodiment, as mentioned above, it is found that the phase distribution of the observation object, which is the same as in the measurement on the conventional fringe scanning method, is derived from two images in which the amounts of retardation between the polarized components are ±θ. In particular, when the conventional fringe scanning method is applied, four images of different amounts of retardation between the polarized components are required. In the third embodiment, by contrast, the same phase distribution as in the conventional method can be obtained only by using two images of different amounts of retardation between the polarized components, and thus measuring time can be reduced.

In the detection method of the third embodiment, where it is known that the amount of phase of an object observed is relatively small, the approximation of tan φ=φ is established. Thus, a process for finding the arc tangent can be omitted, and measuring time can be further reduced. Even where the image after the ratio between the differential image and the summed image has been obtained is deconvoluted, the same result is brought about.

The optical transfer function of the differential interference microscope changes with the diameter of the aperture stop of the illumination optical system. The phase distribution is sometimes shifted to a particular spatial frequency band, depending on the kind of observation object. For the phase detection of such an object, the transfer function can be maintained with a value close to 1 by a proper choice of the diameter of the aperture stop, and hence the phase distribution can be accurately obtained without deconvolution processing.

Although in the third embodiment the detection of the amount of retardation between the polarized components is performed by detecting the angle of rotation of the polarizer 30, a means for detecting the amount of retardation between the polarized components may be added to the detection apparatus so that a signal from this detecting means is used to find the amount of retardation between the polarized components. When the amount of retardation between the polarized components is varied, not only is the polarizer 30 rotated, but also a liquid crystal element is interposed between the polarizer 30 and the quarter-wave plate 31 to changed the applied voltage of the liquid crystal element, or a half-wave plate is removably disposed between the polarizer 30 and the quarter-wave plate 31. Even when such a technique is used, the same effect is secured.

The third embodiment cites an example in which a transmission observation is made, but even when the reflection type differential interference microscope shown in FIG. 1 is used, the same phase distribution can be obtained. In this case, however, when the observation object is a reflective object such as a metal, the value of the phase distribution to be detected is doubled. In such a case, therefore, it is necessary to find the phase distribution as $k = \lambda/4\pi$ in Eq. (22).

The third embodiment provides a specific method that the phase distribution of the observation object is derived from two images in which the amounts of retardation between the polarized components are ±θ. Similarly, two images in which the amounts of retardation between the polarized components are ±θ and an image in which the amount of retardation between the polarized components is zero are captured, and a value twice the image information in which the amount of retardation between the polarized components is zero is subtracted from the image shown in FIG. 9D to find B (x, y), where B (x, y)=S (x, y)−2·0 (x, y), so that the ratio between the differential image shown in FIG. 9C and B (x, y) is obtained. In this way, a phase distribution in which the influence of scattering of light at the edge on the observation object is excluded can be detected.

In the present invention, as in the first to third embodiments, reference has been made to the method of photographing the images with a single photographing means (CCD camera) while varying the amount of retardation between the polarized components. However, the present invention is not limited to the use of a single imaging means, and even when two photographing means are used, the same effect can be brought about.

Figure 13:
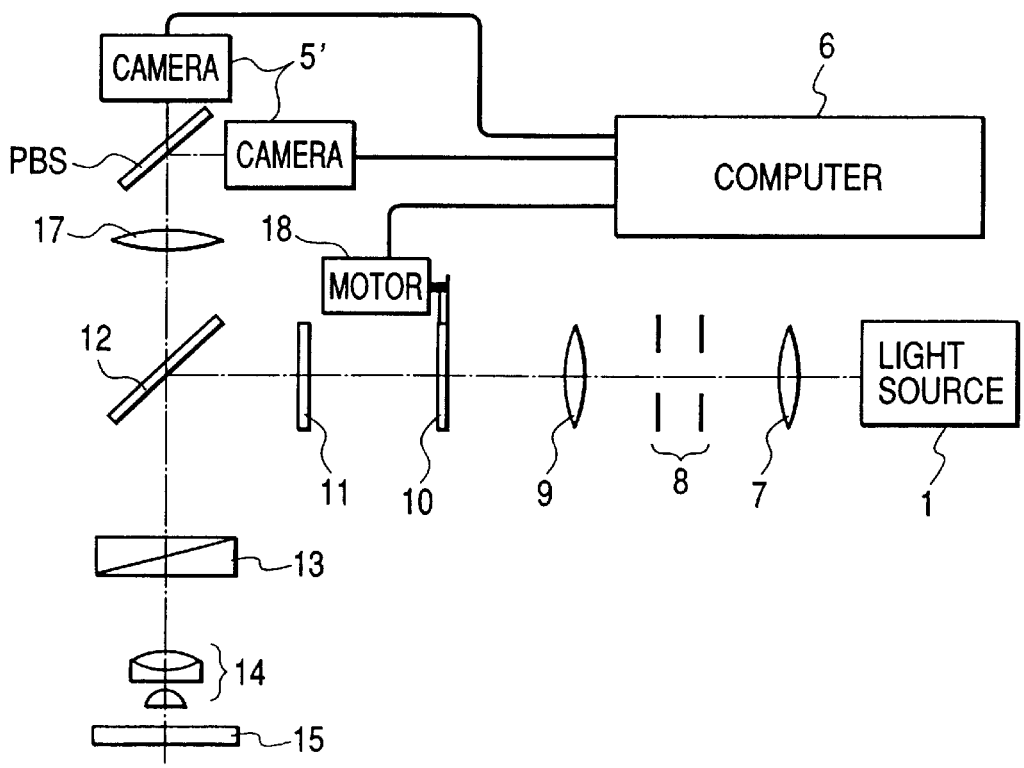
FIG. 13 is a view showing the arrangement of an apparatus for detecting various physical amounts relative to the observation object with reflecting illumination by the use of two CCD cameras in the present invention.
Figure 14:
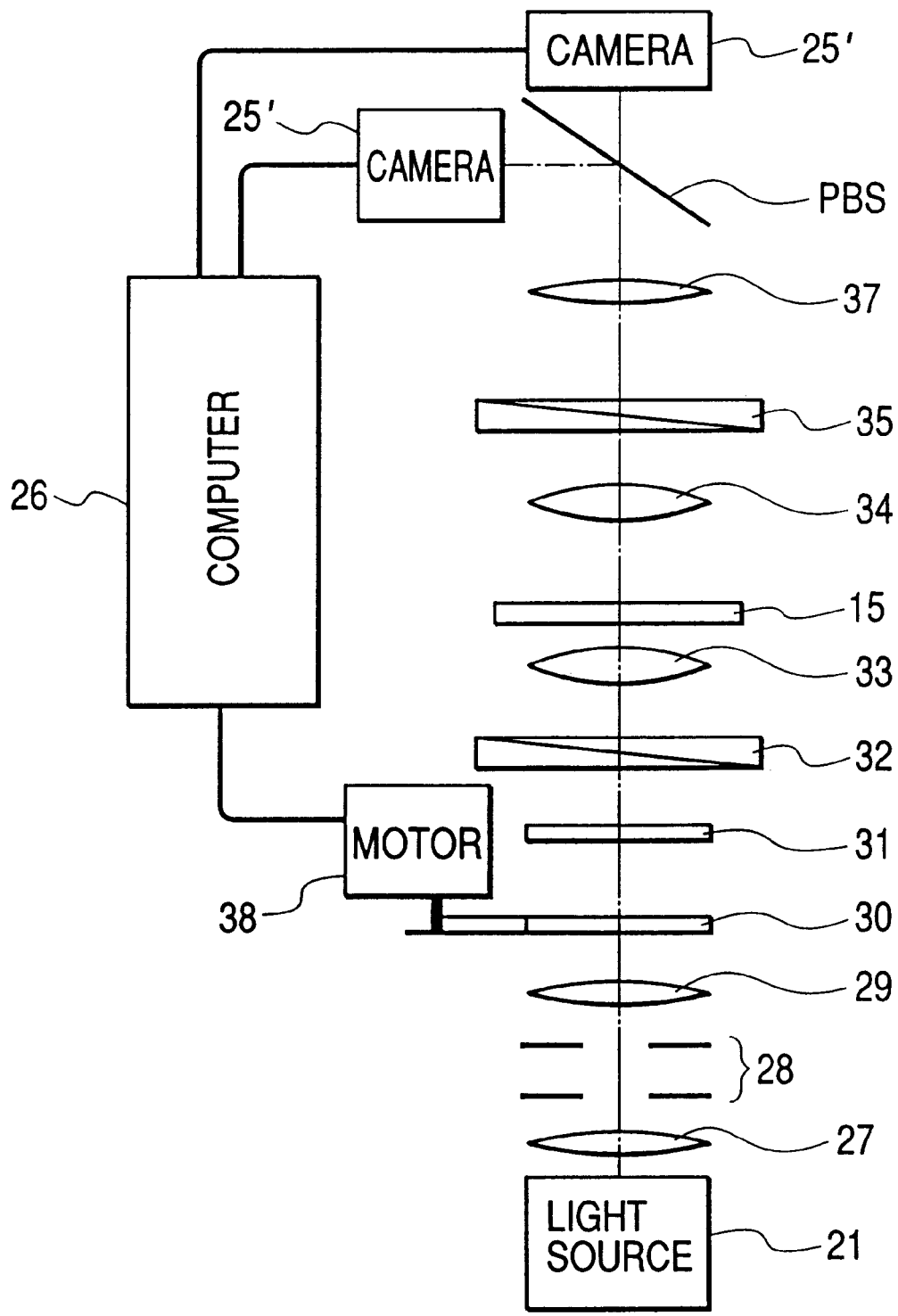
FIG. 14 is a view showing the arrangement of the apparatus for detecting various physical amounts relative to the observation object with transmitting illumination by the use of two CCD cameras in the present invention.

For example, as shown in each of FIGS. 13 and 14, a polarization beam splitter PBS may be placed, instead of the analyzer, in the imaging optical system to split light into two polarized components perpendicular to each other so that individual components are received by two CCD cameras 5' or 25'. By doing so, differential interference images in which the amounts of retardation between the polarized components are equal, but signs are different are formed on the image pickup surfaces of the two CCD cameras 5' or 25'.

Thus, calculations on the images obtained by the two CCD cameras allow the detection of physical amounts such as the gradient, planar portion, birefringent portion, distortion, edge of the step, and phase distribution of the observation object.

What is claimed is:

1. A detection apparatus comprising:
   a differential interference microscope including:
     a light source;
     an illumination optical system for introducing light from said light source onto an observation object, provided with a member for splitting the light from said light source into two polarized components; and
     an imaging optical system for forming an image of said observation object, provided with a member for recombining said two polarized components split in said illumination optical system;
   means for changing an amount of retardation between said two polarized components; and
   means for photographing the image of said observation object,
   two differential interference images relative to said observation object in which amounts of retardation are equal and signs are different, formed by said means for changing an amount of retardation being photographed by said means for photographing the image,
   wherein said detection apparatus further comprises calculation means for detecting a gradient of said observation object in such a way that a differential calculation is performed on each set of opposite pixels with respect to said two differential interference images to obtain differential image information, from which image information in a predetermined range is extracted.

2. A method applied to a detection apparatus comprising:
   a differential interference microscope including:
     a light source;
     an illumination optical system for introducing light from said light source onto an observation object, provided with a member for splitting the light from said light source into two polarized components; and
     an imaging optical system for forming an image of said observation object, provided with a member for recombining said two polarized components split in said illumination optical system;
   means for changing an amount of retardation between said two polarized components; and
   means for photographing the image of said observation object,
   two differential interference images relative to said observation object in which amounts of retardation are equal and signs are different, formed by said means for changing an amount of retardation being photographed by said means for photographing the image,
   wherein a differential calculation is performed on each set of opposite pixels with respect to said two differential interference images to obtain differential image information, from which image information in a predetermined range is extracted, and thereby a gradient of said observation object is detected.

3. A detection apparatus comprising:
   a differential interference microscope including:
     a light source;
     an illumination optical system for introducing light from said light source onto an observation object, provided with a member for splitting the light from said light source into two polarized components; and
     an imaging optical system for forming an image of said observation object, provided with a member for recombining said two polarized components split in said illumination optical system;
   means for changing an amount of retardation between said two polarized components; and
   means for photographing the image of said observation object,
   two differential interference images relative to said observation object in which amounts of retardation are equal and signs are different, formed by said means for changing an amount of retardation being photographed by said means for photographing the image,
   wherein said detection apparatus further comprises means for detecting an edge of said observation object in such a way that a differential calculation is performed on each set of opposite pixels with respect to said two differential interference images to obtain differential image information, in which an absolute value is found to set a predetermined threshold, and image information exceeding said threshold is extracted.

4. A method applied to a detection apparatus comprising:
   a differential interference microscope including:
     a light source;
     an illumination optical system for introducing light from said light source onto an observation object, provided with a member for splitting the light from said light source into two polarized components; and
     an imaging optical system for forming an image of said observation object, provided with a member for recombining said two polarized components split in said illumination optical system;

means for changing an amount of retardation between said two polarized components; and means for photographing the image of said observation object, two differential interference images relative to said observation object in which amounts of retardation are equal and signs are different, formed by said means for changing an amount of retardation being photographed by said means for photographing the image, wherein a differential calculation is performed on each set of opposite pixels with respect to said two differential interference images to obtain differential image information, in which an absolute value is found to set a predetermined threshold so that an image area exceeding said threshold is extracted, and thereby an edge of said observation object is detected.

5. A detection apparatus comprising:

a differential interference microscope including:
  a light source;
  an illumination optical system for introducing light from said light source onto an observation object, provided with a member for splitting the light from said light source into two polarized components; and
  an imaging optical system for forming an image of said observation object, provided with a member for recombining said two polarized components split in said illumination optical system;

means for changing an amount of retardation between said two polarized components;

means for detecting said amount of retardation; and means for photographing the image of said observation object, two differential interference images relative to said observation object in which amounts of retardation are equal and signs are different, formed by said means for changing an amount of retardation being photographed by said means for photographing the image, wherein a differential calculation and a summed calculation are performed on each set of opposite pixels with respect to said two differential interference images so that differential image information D(x, y) and summed image information S(x, y) are obtained, and when θ denotes said amount of retardation between the polarized components, detected by said means for detecting said amount of retardation, and Φ(x, y) denotes an amount of phase on said observation object corresponding to each image information, said detection apparatus further comprises calculation means for detecting said amount of phase Φ(x, y) on a surface of said observation object in such a way that a differential value $\partial\Phi(x, y)/\partial r$ of said amount of phase on the observation object corresponding to a direction of separation r between said two polarized components is detected to perform integral processing in the direction r, using one of the following equations:

$$\partial\Phi(x, y)/\partial r = k \cdot \{(1-\cos\theta) \cdot D(x, y)\}/\{2\sin\theta \cdot S(x, y)\}$$

$$\partial\Phi(x, y)/\partial r = k \cdot \tan^{-1}[\{(1-\cos\theta) \cdot D(x, y)\}/\{2\sin\theta \cdot S(x, y)\}]$$

where in a case of a transmission observation on said observation object, $k=\lambda/2\pi$, and in a case of a reflection observation on said observation object, $k=\lambda/4\pi$ when $\lambda$ is a wavelength of light emitted from said light source of said detection apparatus.

6. A method applied to a detection apparatus comprising:

a differential interference microscope including:
  a light source;
  an illumination optical system for introducing light from said light source onto an observation object, provided with a member for splitting the light from said light source into two polarized components; and
  an imaging optical system for forming an image of said observation object, provided with a member for recombining said two polarized components split in said illumination optical system;

means for changing an amount of retardation between said two polarized components;

means for detecting said amount of retardation; and means for photographing the image of said observation object, two differential interference images relative to said observation object in which amounts of retardation are equal and signs are different, formed by said means for changing an amount of retardation being photographed by said means for photographing the image, wherein a differential calculation and a summed calculation are performed on each set of opposite pixels with respect to said two differential interference images so that differential image information D(x, y) and summed image information S(x, y) are obtained, and when θ denotes said amount of retardation between the polarized components, detected by said means for detecting said amount of retardation, and Φ(x, y) denotes an amount of phase on said observation object corresponding to each image information, said amount of phase Φ(x, y) on a surface of said observation object is detected in such a way that a differential value $\partial\Phi(x, y)/\partial r$ of said amount of phase on the observation object corresponding to a direction of separation r between said two polarized components is detected to perform integral processing in the direction r, using one of the following equations:

$$\partial\Phi(x, y)/\partial r = k \cdot \{(1-\cos\theta) \cdot D(x, y)\}/\{2\sin\theta \cdot S(x, y)\}$$

$$\partial\Phi(x, y)/\partial r = k \cdot \tan^{-1}[\{(1-\cos\theta) \cdot D(x, y)\}/\{2\sin\theta \cdot S(x, y)\}]$$

where in a case of a transmission observation on said observation object, $k=\lambda/2\pi$, and in a case of a reflection observation on said observation object, $k=\lambda/4\pi$ when $\lambda$ is a wavelength of light emitted from said light source of said detection apparatus.

7. A detection apparatus according to claim 1, wherein the gradient of said observation object is detected in such a way that amounts of retardation between said two polarized components split in said illumination optical system are detected to form said two differential interference images relative to said observation object in which the amounts of retardation between the polarized components are equal and signs are different; a differential calculation and a summed calculation are performed on each set of opposite pixels with respect to said two differential interference images so that a differential image and a summed image are obtained; a ratio of image information between said differential image and said summed image is calculated; and from a result thus obtained, image information in a predetermined range is extracted.

8. A detection apparatus according to claim 7, wherein a portion or a planar portion of said observation object which undergoes no phase change is detected in such a way that image information in a predetermined range, with a zero value as a center, is extracted from the image information obtained as a result of the calculation.

9. A detection apparatus according to claim 8, wherein an area or contour of the portion or the planar portion of said observation object which undergoes no phase change is compared with an area or contour of a planar portion previously obtained from a sample as a reference, and thereby a difference between said observation object and said sample is detected.

10. A detection apparatus according to claim 3, wherein the edge of said observation object is detected in such a way that amounts of retardation between said two polarized components split in said illumination optical system are detected to form said two differential interference images relative to said observation object in which the amounts of retardation between the polarized components are equal and signs are different; a differential calculation and a summed calculation are performed on each set of opposite pixels with respect to said two differential interference images to obtain a differential image and a summed image; a ratio of image information between the differential image and the summed image is calculated every pixel; an absolute value of image information of said observation object is found from this result to set a predetermined threshold; and image information exceeding the threshold is extracted.

11. A detection apparatus according to claim 3, wherein the edge of said observation object is detected in such a way that amounts of retardation between said two polarized components split in said illumination optical system are detected to form said two differential interference images relative to said observation object in which the amounts of retardation between the polarized components are equal and signs are different; a differential calculation is performed on each set of opposite pixels with respect to said two differential interference images to obtain a differential image; the square of a value divided by a value between the maximum and the minimum in the differential image is found to set a predetermined threshold; and an image area exceeding this threshold is extracted.

12. A detection apparatus according to claim 3, wherein the edge of said observation object is detected in such a way that amounts of retardation between said two polarized components split in said illumination optical system are detected to form said two differential interference images relative to said observation object in which the amounts of retardation between the polarized components are equal and signs are different; a differential calculation and a summed calculation are performed on each set of opposite pixels with respect to said two differential interference images to obtain a differential image and a summed image; a ratio of image information between the differential image and the summed image is calculated every pixel; resulting image information is divided by a value between a maximum and a minimum in the image information; a resulting value is squared to set a predetermined threshold; and an image area exceeding said threshold is extracted.

13. A method according to claim 4, wherein a position of the edge on said observation object is detected by finding coordinates of said image area exceeding said threshold.

14. A method according to claim 4, wherein a position of the edge on said observation object is detected by finding a center or a center of gravity of said image area exceeding said threshold.

15. A method according to claim 4, wherein a distance between edges on said observation object is detected by finding coordinates of said image area exceeding said threshold.

16. A method according to claim 4, wherein a distance between edges on said observation object is detected by finding a center or a center of gravity of said image area exceeding said threshold.

17. A method applied to a detection apparatus comprising:
a differential interference microscope including:
a light source;
an illumination optical system for introducing light from said light source onto an observation object, provided with a member for splitting the light from said light source into two polarized components; and
an imaging optical system for forming an image of said observation object, provided with a member for recombining said two polarized components split in said illumination optical system;
means for changing an amount of retardation between said two polarized components; and
means for photographing the image of said observation object,
two differential interference images relative to said observation object in which amounts of retardation are equal and signs are different, formed by said means for changing an amount of retardation being photographed by said means for photographing the image,
wherein amounts of retardation between said two polarized components split in said illumination optical system are detected to form said two differential interference images in which the amounts of retardation between the polarized components are equal and signs are different; a differential calculation and a summed calculation are performed on each set of opposite pixels with respect to said two differential interference images so that differential image information and summed image information are acquired; and when θ denotes a detected amount of retardation between said polarized components, D(x, y) denotes said differential image information, S(x, y) denotes said summed image information, Φ(x, y) denotes an amount of phase on a surface of said observation object corresponding to each image information, and d(x, y) denotes image information in which said differential image information D(x, y) is deconvoluted by using an optical transfer function of said differential interference microscope, said amount of phase Φ(x, y) on the surface of said observation object is detected by using one of the following equations:

Φ(x, y)=k·{(1−cos θ)·d(x, y)}/{2 sin θ·S(x, y)}

Φ(x, y)=k·tan⁻¹ [{(1−cos θ)·d(x, y)}/{2 sin θ·S(x, y)}]

where in a case of a transmission observation on said observation object, k=λ/2π, and in a case of a reflection observation on said observation object, k=λ/4π when λ is a wavelength of light emitted from said light source of said detection apparatus.

18. A method applied to a detection apparatus comprising:
a differential interference microscope including:
a light source;
an illumination optical system for introducing light from said light source onto an observation object, provided with a member for splitting the light from said light source into two polarized components; and
an imaging optical system for forming an image of said observation object, provided with a member for recombining said two polarized components split in said illumination optical system;

means for changing an amount of retardation between said two polarized components; and means for photographing the image of said observation object, two differential interference images relative to said observation object in which amounts of retardation are equal and signs are different, formed by said means for changing an amount of retardation being photographed by said means for photographing the image, wherein amounts of retardation between said two polarized components split in said illumination optical system are detected to form said two differential interference images in which the amounts of retardation between said polarized components are equal and signs are different; a differential calculation and a summed calculation are performed on each set of opposite pixels with respect to said two differential interference images so that differential image information and summed image information are acquired; and when θ denotes a detected amount of retardation between said polarized components, D(x, y) denotes said differential image information, S(x, y) denotes said summed image information, Φ(x, y) denotes an amount of phase on a surface of said observation object corresponding to each image information, d(x, y) denotes image information in which said differential image information D(x, y) is deconvoluted by using an optical transfer function of said differential interference microscope, and L(x, y) denotes image formation in which the minimum in the summed image information is enveloped, said amount of phase Φ(x, y) on the surface of said observation object is detected by using one of the following equations:

$$\Phi(x, y) = k \cdot \{(1-\cos \theta) \cdot d(x, y)\} / \{2 \sin \theta \cdot L(x, y)\}$$

$$\Phi(x, y) = k \cdot \tan^{-1}[\{(1-\cos \theta) \cdot d(x, y)\}/\{2 \sin \theta \cdot L(x, y)\}]$$

where in a case of a transmission observation on said observation object, $k=\lambda/2\pi$, and in a case of a reflection observation on said observation object, $k=\lambda/4\pi$ when $\lambda$ is a wavelength of light emitted from said light source of said detection apparatus.

19. A method applied to a detection apparatus comprising:
a differential interference microscope including:
a light source;
an illumination optical system for introducing light from said light source onto an observation object, provided with a member for splitting the light from said light source into two polarized components; and
an imaging optical system for forming an image of said observation object, provided with a member for recombining said two polarized components split in said illumination optical system;

means for changing an amount of retardation between said two polarized components; and means for photographing the image of said observation object, two differential interference images relative to said observation object in which amounts of retardation are equal and signs are different, formed by said means for changing an amount of retardation being photographed by said means for photographing the image, wherein amounts of retardation between said two polarized components split in said illumination optical system are detected to form said two differential interference images in which the amounts of retardation between said polarized components are equal and signs are different and a differential interference image in which the amount of retardation between the polarized components is zero; a differential calculation and a summed calculation are performed on each set of opposite pixels with respect to said two differential interference images to acquire differential image information and summed image information; and when θ denotes a detected amount of retardation between said polarized components, 0 (x, y) denotes image information where the amount of retardation between said polarized components is zero, D(x, y) denotes said differential image information, S(x, y) denotes said summed image information, Φ(x, y) denotes an amount of phase on a surface of said observation object corresponding to each image information, and d(x, y) denotes image information in which said differential image information D(x, y) is deconvoluted by using an optical transfer function of said differential interference microscope, said amount of phase Φ(x, y) on the surface of said observation object is detected by detecting a differential value $\partial \Phi(x, y)/\partial r$ of the amount of phase on the observation object corresponding to a direction of separation r between said two polarized components to perform integral processing in the direction r, using one of the following equations:

$$\partial \Phi(x, y)/\partial r = k \cdot \{(1-\cos \theta) \cdot D(x, y)\}/\{2 \sin \theta \cdot B (x, y)\}$$

$$\partial \Phi(x, y)/\partial r = k \cdot \tan^{-1}[\{(1-\cos \theta) \cdot D(x, y)\}/\{2 \sin \theta \cdot B (x, y)\}]$$

where in a case of a transmission observation on said observation object, $k=\lambda/2\pi$ and in a case of a reflection observation on said observation object, $k=\lambda/4\pi$ when $\lambda$ is a wavelength of light emitted from said light source of said detection apparatus, and B (x, y) = S(x, y) – 2·0 (x, y).

20. A method applied to a detection apparatus comprising:
a differential interference microscope including:
a light source;
an illumination optical system for introducing light from said light source onto an observation object, provided with a member for splitting the light from said light source into two polarized components; and
an imaging optical system for forming an image of said observation object, provided with a member for recombining said two polarized components split in said illumination optical system;

means for changing an amount of retardation between said two polarized components; and means for photographing the image of said observation object, two differential interference images relative to said observation object in which amounts of retardation are equal and signs are different, formed by said means for changing an amount of retardation being photographed by said means for photographing the image, wherein amounts of retardation between said two polarized components split in said illumination optical system are detected to form said two differential interference images in which the amounts of retardation between said polarized components are equal and signs are different and a differential interference image in which the amount of retardation between the polarized components is zero; a differential calculation and a summed calculation are performed on each set of opposite pixels with respect to said two differential interference images to acquire differential image information and summed image information; and when θ denotes a detected amount of retardation between said polarized components, 0 (x, y) denotes image information where the amount of retardation between said polarized components is zero, D(x, y) denotes said differential image information, S(x, y) denotes said summed image information, Φ(x, y) denotes an amount of phase on a surface of said observation object corresponding to each image information, and d(x, y) denotes image information in which said differential image information D(x, y) is deconvoluted by using an optical transfer function of said differential interference microscope, said amount of phase Φ(x, y) on the surface of said observation object is detected by using one of the following equations:

$$\Phi(x, y)=k \cdot \{(1-\cos\theta) \cdot d(x, y)\}/\{2 \sin\theta \cdot B(x, y)\}$$

$$\Phi(x, y)=k \cdot \tan^{-1}[\{(1-\cos\theta) \cdot d(x, y)\}/\{2 \sin\theta \cdot B(x, y)\}]$$

where in a case of a transmission observation on said observation object, $k=\lambda/2\pi$ and in a case of a reflection observation on said observation object, $k=\lambda/4\pi$ when $\lambda$ is a wavelength of light emitted from said light source of said detection apparatus, and B (x, y)=S(x, y)−2·0 (x, y).

21. A method applied to a detection apparatus comprising:
   a differential interference microscope including:
     a light source;
     an illumination optical system for introducing light from said light source onto an observation object, provided with a member for splitting the light from said light source into two polarized components; and
     an imaging optical system for forming an image of said observation object, provided with a member for recombining said two polarized components split in said illumination optical system;
   means for changing an amount of retardation between said two polarized components; and
   means for photographing the image of said observation object,
   two differential interference images relative to said observation object in which amounts of retardation are equal and signs are different, formed by said means for changing an amount of retardation being photographed by said means for photographing the image,
   wherein amounts of retardation between said two polarized components split in said illumination optical system are detected to form said two differential interference images in which the amounts of retardation between said polarized components are equal and signs are different and a differential interference image in which the amount of retardation between the polarized components is zero; a differential calculation and a summed calculation are performed on each set of opposite pixels with respect to said two differential interference images to acquire differential image information and summed image information; and when θ denotes a detected amount of retardation between said polarized components, 0 (x, y) denotes image information where the amount of retardation between said polarized components is zero, D(x, y) denotes said differential image information, S(x, y) denotes said summed image information, Φ(x, y) denotes an amount of phase on a surface of said observation object corresponding to each image information, d(x, y) denotes image information in which said differential image information D(x, y) is deconvoluted by using an optical transfer function of said differential interference microscope, and b (x, y) denotes image information in which the minimum in {S(x, y)−2·0 (x, y)} is enveloped, said amount of phase Φ on the surface of said observation object is detected by using one of the following equations:

$$\Phi(x, y)=k \cdot \{(1-\cos\theta) \cdot d(x, y)\}/\{2 \sin\theta \cdot b(x, y)\}$$

$$\Phi(x, y)=k \cdot \tan^{-1}[\{(1-\cos\theta) \cdot d(x, y)\}/\{2 \sin\theta \cdot b(x, y)\}]$$

where in a case of a transmission observation on said observation object, $k=\lambda/2\pi$, and in a case of a reflection observation on said observation object, $k=\lambda/4\pi$ when $\lambda$ is a wavelength of light emitted from said light source of said detection apparatus.

* * * * *